(12) United States Patent
Wu et al.

(10) Patent No.: US 9,557,596 B2
(45) Date of Patent: Jan. 31, 2017

(54) LIQUID CRYSTAL DISPLAY

(75) Inventors: Ting-I Wu, Kaoshiung (TW);
Wang-Yang Li, Tainan (TW)

(73) Assignee: CHI MEI MATERIALS TECHNOLOGY CORPORATION, Tainan (TW)

(*) Notice: Subject to any disclaimer, the term of this patent is extended or adjusted under 35 U.S.C. 154(b) by 229 days.

(21) Appl. No.: 13/571,374

(22) Filed: Aug. 10, 2012

(65) Prior Publication Data
US 2013/0038821 A1     Feb. 14, 2013

(30) Foreign Application Priority Data

Aug. 11, 2011 (TW) ............................... 100128742 A

(51) Int. Cl.
G02F 1/1335 (2006.01)

(52) U.S. Cl.
CPC ... G02F 1/133504 (2013.01); G02F 1/133528 (2013.01); *G02F 2001/133507* (2013.01); *G02F 2001/133531* (2013.01); *G02F 2201/305* (2013.01)

(58) Field of Classification Search
CPC ................................................. G02F 2201/305
See application file for complete search history.

(56) References Cited

U.S. PATENT DOCUMENTS

| 6,075,581 | A  | * | 6/2000 | Shirochi | ........... | G02F 1/133504 |
| | | | | | | 348/833 |
| 6,678,026 | B2 | * | 1/2004 | Maeda et al. | ................. | 349/113 |
| 7,314,652 | B2 | * | 1/2008 | Hay et al. | ...................... | 428/1.1 |
| 7,675,591 | B2 | * | 3/2010 | Kim et al. | ..................... | 349/106 |
| 2010/0171906 | A1 | * | 7/2010 | Sakai | ............................... | 349/96 |
| 2012/0013654 | A1 | * | 1/2012 | Yashiro | ............. | G02F 1/133504 |
| | | | | | | 345/690 |

FOREIGN PATENT DOCUMENTS

| CN | 101338875 A | 1/2009 |
| CN | 101512400 A | 8/2009 |
| EP | 0567995 A1 | 11/2004 |
| JP | 2002-303865 A | 10/2002 |
| JP | 2003-057631 A | 2/2003 |
| JP | 2005070632 A | 3/2005 |

(Continued)

*Primary Examiner* — Edward Glick
*Assistant Examiner* — Mark Teets
(74) *Attorney, Agent, or Firm* — CKC & Partners Co., Ltd.

(57) ABSTRACT

A liquid crystal display (LCD) is provided and includes an liquid crystal panel, a diffraction plate, a first polarizer, a second polarizer, a first brightness enhancement film (BEF), and a second BEF. The diffraction plate is disposed on a first surface of the liquid crystal panel and has a diffractive direction. The first polarizer is disposed between the diffraction plate and the liquid crystal panel and has a first absorption axis. The second polarizer is disposed on a second surface of the liquid crystal panel opposite to the first surface and has a second absorption axis perpendicular to the first absorption axis. The first BEF has a first light-collecting direction. The second BEF has a second light-collecting direction perpendicular to the first light-collecting direction. The first light-collecting direction is parallel or perpendicular to the diffractive direction or the first absorption axis.

9 Claims, 34 Drawing Sheets

(56) References Cited

FOREIGN PATENT DOCUMENTS

| | | |
|---|---|---|
| JP | 2008-258141 A | 10/2008 |
| JP | 2009-86682 A | 4/2009 |
| TW | 200401918 | 2/2004 |
| TW | 200402576 | 2/2004 |
| TW | 200500710 | 1/2005 |
| WO | 2008/029555 A1 | 3/2008 |

* cited by examiner

LIQUID CRYSTAL DISPLAY

RELATED APPLICATIONS

This application claims priority to Taiwan Application Serial Number 100128742, filed Aug. 11, 2011, which is herein incorporated by reference.

BACKGROUND

Field of Invention

The present invention relates to a liquid crystal display (LCD), and more particularly, the present invention relates to a wide viewing angle LCD utilizing light diffraction to improve its viewable range.

Description of Related Art

With rapid advancement of the fabrication technology of thin film transistors, and because of the advantages the liquid crystal display (LCD) device, such as lightness, thinness, low power consumption, and no harmful radiations, the LCD device has been widely applied on various electronic products such as television, personal digital assistant, notebook, digital camera, video camera, recorder, and mobile phone, etc. However, since not being a self-luminous display, the LCD device generally needs a backlight source to generate light which is then guided to pass through optical films such as diffusion layers and brightness enhancement films (BEF), thereby forming a uniform planar light emitted into an LCD panel for showing images. A twisted nematic (TN) or super twisted nematic (STN) LCD device is one of the popular LCD devices. Although the TN or STN LCD device may have an advantage of competitive price, yet the viewing angle of such display is smaller than that of a wide viewing angle LCD (for example, a multiple-domain vertical alignment (MVA) display, an in-plane switching (IPS) display, or a fringe field switching (FFS) display, etc.).

The so-called viewing angle means an angle within a range that an observer can observe the image shown by a display with a certain quality. For example, for a desktop LCD, a user often looks at the desktop LCD in a normal viewing angle. Thus, due to different alignments of liquid crystal molecules lead to different optical effects, a designer will take the image quality of the display corresponding to the normal viewing angle as a main consideration when designing the displays. When looking at the display in an oblique viewing angle, an observer may perceive a difference (such as brightness difference or chroma difference) between an image observed in the normal viewing angle and the image observed in the oblique viewing angle, and the difference becomes greater with increase of a observing angle of the observer. Among common LCDs, the TN LCD has the most serious viewing angle problem described above.

In comparison to the TN LCD having the problem of poor viewing angle, a vertical alignment (VA) LCD provides another option for the people to meet their demands of wide viewing angle.

Although the VA LCD may have a wider viewing angle than the TN LCD, yet the VA LCD still has some disadvantages, such as unsymmetrical viewing angles, so that those in this industry often adopt a multi-domain vertical alignment (MVA) technology to overcome the disadvantages. Besides, another problem for the VA LCD is the color shift problem, i.e. the color differences between a main viewing angle and other viewing angle are quite large. Those in this industry mostly use more complicated pixel designs collaborated with signal designs to improve the aforementioned problem.

Although these designs may improve the viewing angle of the VA LCD, yet these designs may also result in the problems of lowered process yield, lowered aperture ratio, increased total cost, etc. in accompany with the complicated pixel or signal designs.

Therefore, there is a need to provide a display device for simultaneously improving the image quality about brightness and chroma, including contrast, gray level inversion, deviation of gamma curve, and color shift issues, etc.

SUMMARY

An aspect of the present invention is to provide an LCD for simultaneously improving the image quality about brightness and chroma including contrast, gray level inversion, deviation of gamma curve, and color shift issues, etc.

According to an embodiment of the present invention, the LCD includes an liquid crystal panel, a diffraction plate, a first polarizer, a second polarizer, a first brightness enhancement film (BEF) and a second brightness enhancement film. The liquid crystal panel includes a liquid crystal layer. The diffraction plate is disposed on a first surface of the liquid crystal panel, and has at least one diffractive direction. The first polarizer is disposed between the liquid crystal panel and the diffraction plate, and has a first absorption axis. The second polarizer is disposed on a second surface of the liquid crystal panel, and has a second absorption axis, wherein the second surface is opposite to the first surface, and the second absorption axis is substantially perpendicular to the first absorption axis. The first brightness enhancement film (BEF) has a first light-collecting direction. The second brightness enhancement film has a second light-collecting direction substantially perpendicular to the first light-collecting direction, wherein the first brightness enhancement film is disposed between the second brightness enhancement film and the second polarizer. The diffractive direction is substantially perpendicular or parallel to the first light-collecting direction.

According to another embodiment of the present invention, the LCD includes an liquid crystal panel, a diffraction plate, a first polarizer, a second polarizer, a first brightness enhancement film and a second brightness enhancement film. The liquid crystal panel includes a liquid crystal layer. The diffraction plate is disposed on a first surface of the liquid crystal panel and has at least one diffractive direction. The first polarizer is disposed between the liquid crystal panel and the diffraction plate, and has a first absorption axis. The second polarizer is disposed on a second surface of the liquid crystal panel opposite to the first surface of the liquid crystal panel, and has a second absorption axis substantially perpendicular to the first absorption axis. The first brightness enhancement film has a first light-collecting direction. The second brightness enhancement film has a second light-collecting direction substantially perpendicular to the first light-collecting direction, wherein the first brightness enhancement film is disposed between the second brightness enhancement film and the second polarizer, wherein an included angle between the first diffractive direction and the first light-collecting direction is ranged from −110 degrees to −65 degrees or from −30 degrees to 20 degrees.

According to another embodiment of the present invention, the LCD includes an liquid crystal panel, a diffraction plate, a first polarizer, a second polarizer, a first brightness enhancement film and a second brightness enhancement film. The liquid crystal panel includes a liquid crystal layer. The diffraction plate is disposed on a first surface of the liquid crystal panel, and has at least one diffractive direction. The first polarizer is disposed between the liquid crystal panel and the diffraction plate, and has a first absorption axis. The second polarizer is disposed on a second surface of the liquid crystal panel opposite to the first surface of the liquid crystal panel and has a second absorption axis substantially perpendicular to the first absorption axis. The first brightness enhancement film has a first light-collecting direction. The second brightness enhancement film has a second light-collecting direction substantially perpendicular to the first light-collecting direction, wherein the first brightness enhancement film is disposed between the second brightness enhancement film and the second polarizer, wherein an included angle between the first diffractive direction and the first light-collecting direction is ranged from −115 degrees to −60 degrees or from −30 degrees to 15 degrees.

According to another embodiment of the present invention, the LCD includes an liquid crystal panel, a diffraction plate, a first polarizer, a second polarizer, a first brightness enhancement film and a second brightness enhancement film. The liquid crystal panel includes a liquid crystal layer. The diffraction plate is disposed on a first surface of the Liquid crystal panel, and has at least one diffractive direction. The first polarizer is disposed between the liquid crystal panel and the diffraction plate, and has a first absorption axis. The second polarizer is disposed on a second surface of the liquid crystal panel opposite to the first surface of the liquid crystal panel and has a second absorption axis substantially perpendicular to the first absorption axis. The first brightness enhancement film has a first light-collecting direction. The second brightness enhancement film has a second light-collecting direction substantially perpendicular to the first light-collecting direction, wherein the first brightness enhancement film is disposed between the second brightness enhancement film and the second polarizer, wherein the first absorption axis is substantially parallel or perpendicular to the first light-collecting direction.

According to another embodiment of the present invention, the LCD includes an liquid crystal panel, a diffraction plate, a first polarizer, a second polarizer, a first brightness enhancement film and a second brightness enhancement film. The liquid crystal panel includes a liquid crystal layer. The diffraction plate is disposed on a first surface of the Liquid crystal panel, and has at least one diffractive direction. The first polarizer is disposed between the Liquid crystal panel and the diffraction plate, and has a first absorption axis. The second polarizer is disposed on a second surface of the Liquid crystal panel opposite to the first surface of the liquid crystal panel and has a second absorption axis substantially perpendicular to the first absorption axis. The first brightness enhancement film has a first light-collecting direction. The second brightness enhancement film has a second light-collecting direction substantially perpendicular to the first light-collecting direction, wherein the first brightness enhancement film is disposed between the second brightness enhancement film and the second polarizer, wherein an included angle between the first absorption axis and the first light-collecting direction is ranged from −25 degrees to 20 degrees, from 70 degrees to 115 degrees, from 115 degrees to −25 degrees or from −20 degrees to 15 degrees.

It can be known from the above that the embodiments of the present invention can improve the image quality uniformity for the viewing angles of the LCD by disposing the diffraction plate, and meanwhile, improve the dark state performance of the LCD by adjusting the included angle between the diffractive direction of the diffraction plate and the light-collecting direction or the included angle between the absorption axis of the polarizer and the light-collecting direction of the brightness enhancement film.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
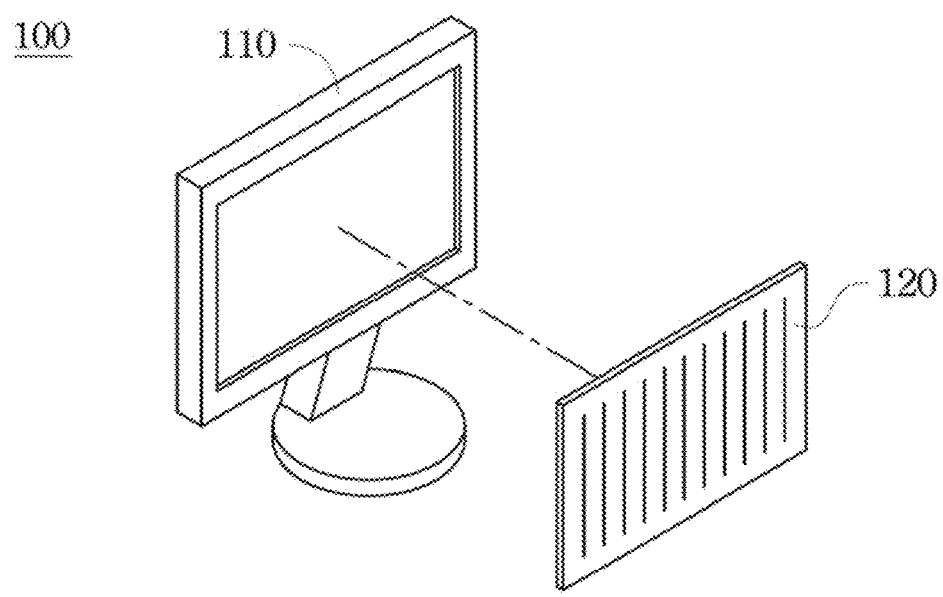
FIG. 1 is a schematic structure diagram of a display device in accordance with the first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 15:
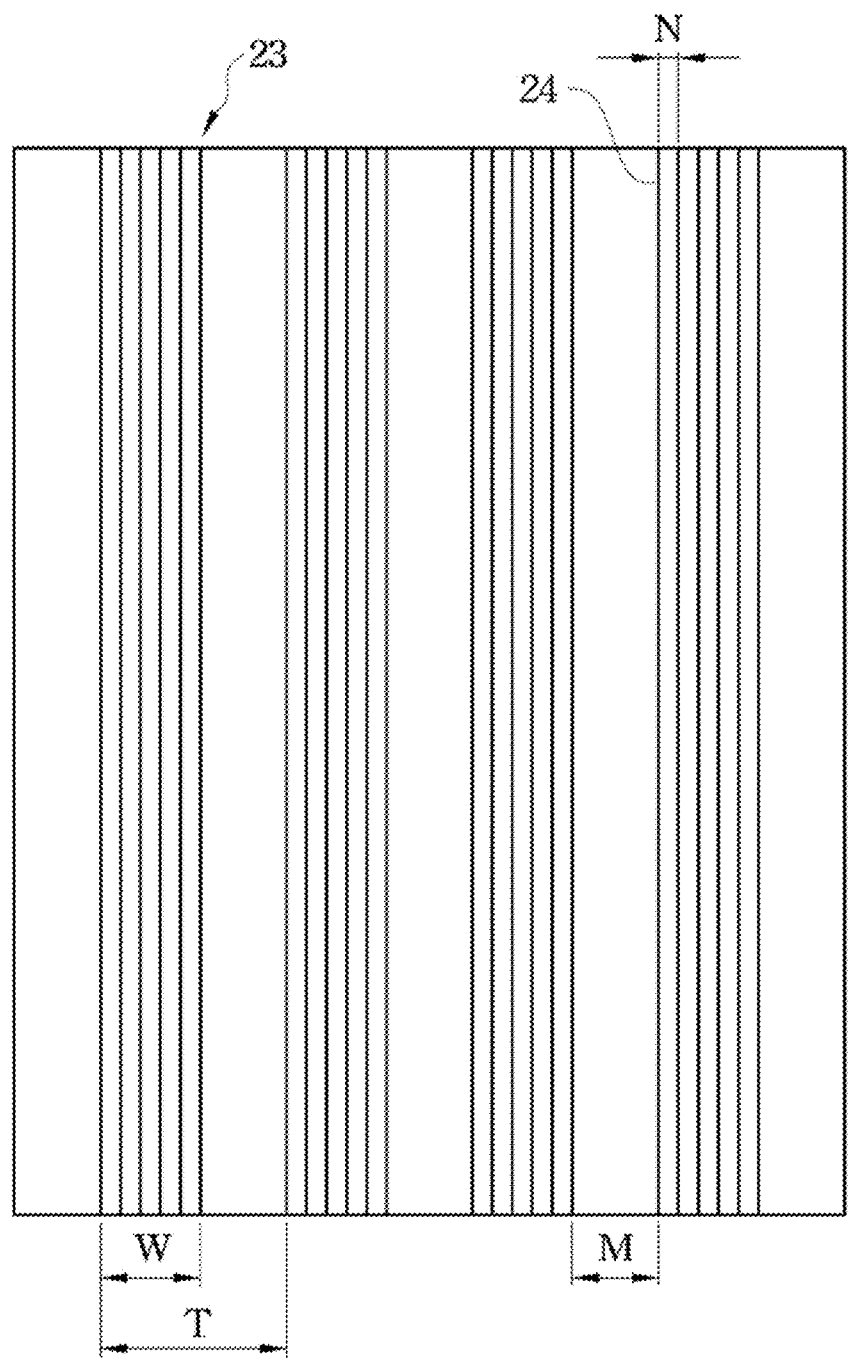
FIG. 15 illustrates the structure of a diffractive plate in accordance with the embodiments of the present invention.

Following embodiments are provided to overcome the problems of prior arts, wherein brightness enhancement films used in the embodiments are fabricated by Optivision Technology Inc, and the model number thereof is KL66-215. In addition, the structure of a diffractive plate used in the embodiments is shown in FIG. 15. The diffractive plate used in the embodiments includes a plurality of grating regions 23. Each of the grating regions 23 has a plurality of gratings 24. The width W of each of grating regions 23 is between 116 μm and 118 μm. The period T of the grating regions 23 is 124 μm. The period N of the gratings 24 is 1 μm. The distance M between the gratings 24 is between 6 μm and 8 μm.

First Embodiment

Referring to FIG. 1, FIG. 1 is a schematic structure diagram of a display device 100 in accordance with an embodiment of the present invention. The display device 100 includes a display 110 and a diffraction plate 120. The display 110 can be an LCD, a plasma display, an organic light emitting diode (OLED) display, an e-paper display, or another display for showing images. The diffraction plate 120 can be a film having diffraction grating (for example, a phase grating) disposed on a light-emitting surface of the display 110 for diffracting the light emitted by the display 110. Further, in another embodiment of the present invention, the diffraction plate 120 can be disposed between an liquid crystal panel and a first polarizer of the display 110.

In the present embodiment, the light emitting direction of the display 110 is presented by a zenithal angle θ and an azimuthal angle φ in a spherical coordinate system. However, in the embodiments of the present invention, an x-y plane in the spherical coordinate system is defined by 0 degree, 90 degrees, Edi 180 degrees and −90 degrees. A long-side of the LCD 110 is the x-axis of the x-y plane in the spherical coordinate system, and a short-side of the LCD 110 is the y-axis of the x-y plane in the spherical coordinate system. For example, a surface of the diffraction plate 120 is defined as the x-y plane, and a positive z-axis is extended from the display 110 (orthogonal to the display) towards an observer (out of the display device 100). Accordingly, a viewing angles of the display device 100 can be represented by (θ, φ), and right and left viewing angles of the display device 100 can be represented by (α, 0) and (β, 180) respectively, wherein 0 degree≤α, β≤90 degrees. Similarly, upper and lower viewing angles of the display device 100 can be represented by (γ, 90) and (δ, 270) respectively, wherein 0 degrees≤γ, δ≤90 degrees. In another embodiment, the short-side of the LCD 110 can be changed as the x-axis of the x-y plane in the spherical coordinate system, and the long-side of the LCD 110 can be changed as the y-axis of the x-y plane in the spherical coordinate system.

In addition, a diffractive direction described in the present embodiment is defined by the direction of a line formed by connecting peaks (valleys) of the diffraction grating. For example, when the line formed by connecting peaks (valleys) of the diffraction grating is in a horizontal direction, i.e. ridges (trenches) are extended in the vertical direction (i.e. the y-axis direction of the x-y plane), the diffractive direction is in a horizontal direction (i.e. the x-axis direction). When the line formed by connecting peaks (valleys) of the diffraction grating is in the vertical direction, i.e. ridges (trenches) are extended in the horizontal direction (i.e. the x-axis direction of the x-y plane), the diffractive direction is in the vertical direction.

Figure 2A:
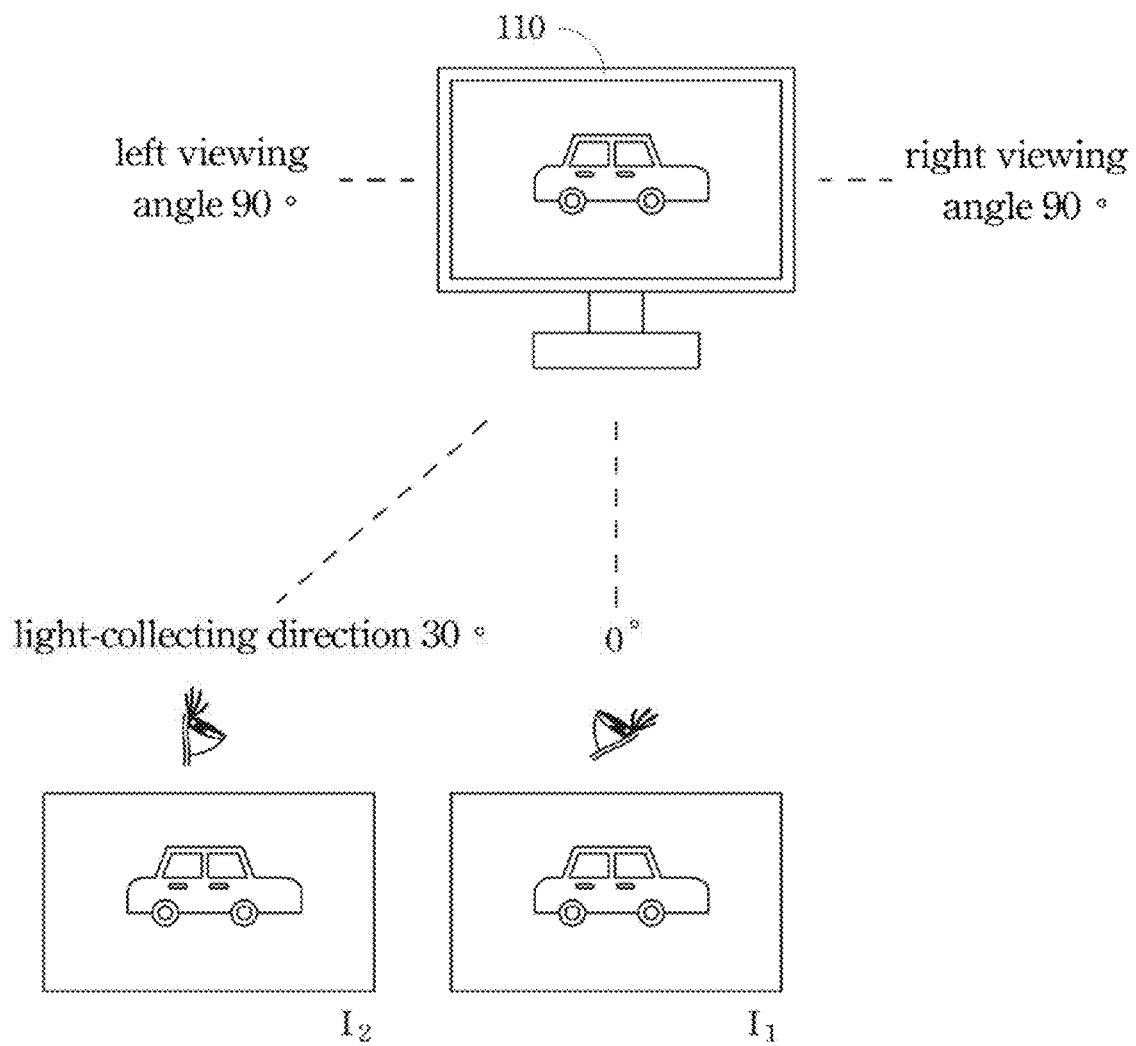
FIG. 2a is a schematic diagram showing that a user observes a display from a side viewing angle.
Figure 2B:
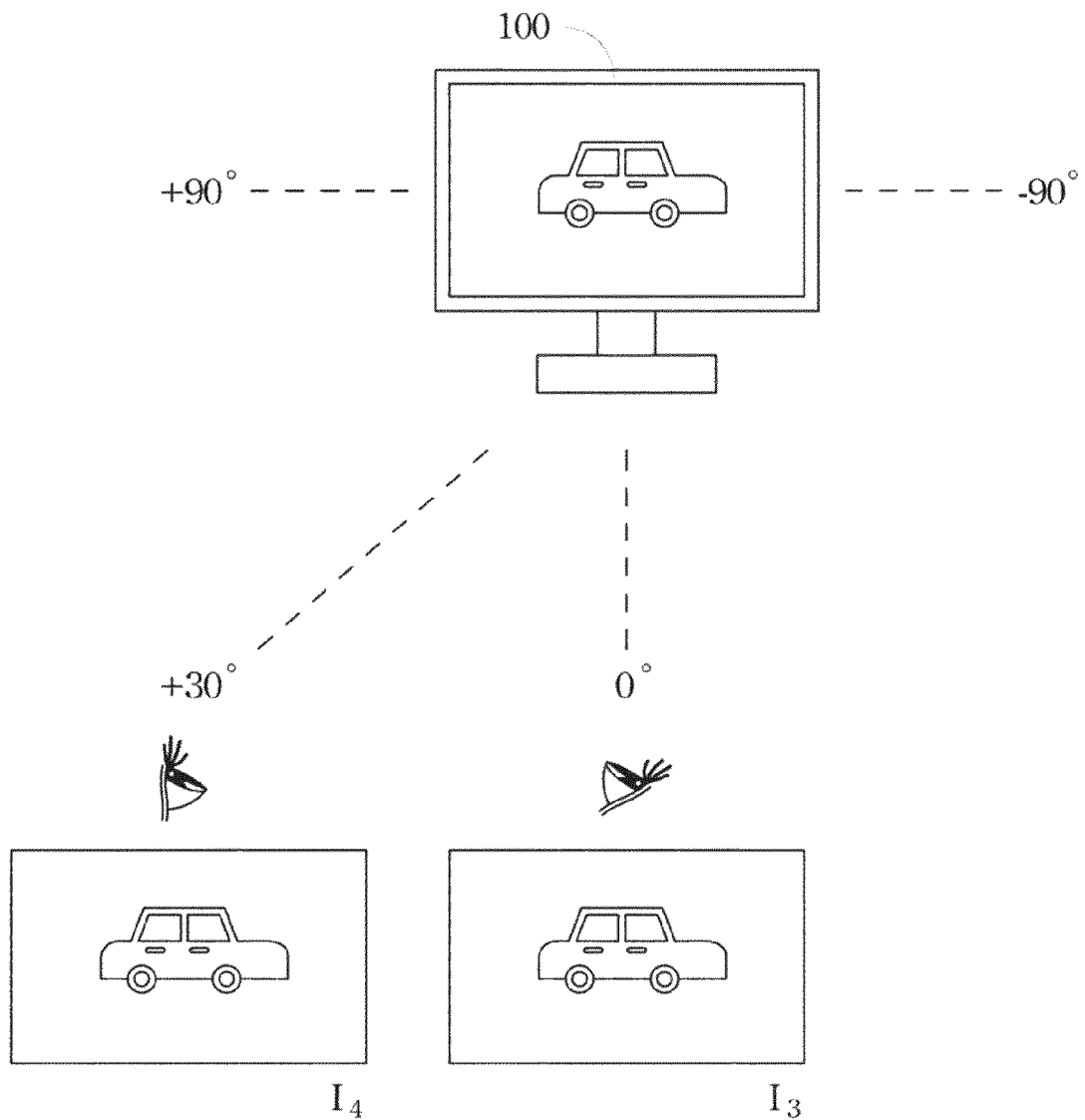
FIG. 2b is a diagram showing that the user observes the display device of the first embodiment of the present invention from the side viewing angle.

Referring to FIG. 2a and FIG. 2b simultaneously, FIG. 2a is a schematic diagram showing that a user looks at the display 110 in a side viewing angle; and FIG. 2b is a diagram showing that the user looks at the display device 100 in the side viewing angle. In the present embodiment, the display 110 is an LCD. Let say that a normal viewing angle of the display device 110 is θ=0 degree, and the maximum value of an oblique viewing angle of the device 110 is θ=90 degrees. For the display 110, the image quality when being observed from θ=90 degrees to θ=10 degrees is worse than that from the normal viewing angle. It means that the user may sense the problems of lower contrast, gray level inversion, deviation of gamma curve, or color shift, etc., when looking at the display 110 in a side viewing angle which is greater than 10 degrees. Certainly, it is not a must to use the image of the normal viewing angle as a basis for image quality comparison. For example, the basis may be an image for an optimum viewing angle in an original design.

Hereinafter, the improvement of the image quality corresponding to a left viewing angle of 30 degrees is illustrated as an example for explained. As shown in FIG. 2a, when looking at an area (such as at the car in FIG. 2a) of the display 110 in a normal viewing angle (0 degrees), the user obtains an observing image $I_1$ (also referred as a normal viewing image $I_1$); and when looking at the area of the display 110 in a left viewing angle of 30 degrees, the user obtains an observing image $I_2$ (also referred to as a side viewing image $I_2$). Because phase retardations caused by a liquid crystal layer of the display are different for the light emitted by a light source of the display, the hue, saturation, and brightness of a pixel of the normal viewing image $I_1$ are apparently different from those of the same pixel of the side viewing mage $I_2$, thus resulting in poor image quality uniformity with different viewing angles. Therefore, the present embodiment uses the diffraction plate 120 to diffract a portion of the light constructing the normal viewing image $I_1$ to the left viewing angle (30 degrees), thereby compensating the side viewing image $I_2$ with a portion of the contents of the normal viewing image $I_1$.

It is noted that, in the present embodiment, when the brightness difference between the pixels at the same locations of the images $I_1$ and $I_2$ is greater than 3% (based on the brightness of the pixel of the image $I_1$), it is considered that the images $I_2$ is apparently different from the images $I_1$ in brightness. Further, when the difference of the values of color coordinates of the pixels at the same locations of the images $I_1$ and $I_2$ is greater than 0.1% (based on the value of the color coordinates of the pixel of the image $I_1$), it is considered that the images $I_2$ is apparently different from the images $I_1$ in chroma. However, in the other embodiments, these threshold values can be modified in accordance with the user's requirements. In addition, when the difference between gamma values corresponding to respective gamma curves of the normal viewing image and the side viewing image $I_2$ is greater than 0.1, it is considered that the deviation of gamma curve occurs.

As shown in FIG. 2b, when looking at the display device 100 in a left viewing angle of 30 degrees, the user can obtain an observed image $I_4$ (also referred to as a side viewing image $I_4$), and the side viewing image $I_4$ is equivalent to a component of image $I_2$ which is not diffracted out plus a component of image $I_1$ which is diffracted to the left viewing angle (30 degrees), i.e. $I_4 = J\ I_2 + k\ I_1$, wherein each of J and k is a positive number smaller than 1. Meanwhile, since a portion of the light constructing the image $I_1$ is diffracted to the side viewing angle, the normal viewing image $I_1$ is converted to another normal viewing image $I_3$ with lower brightness.

For the side viewing image $I_4$ when the component of the normal viewing image diffracted to the side viewing angle (i.e., $kI_1$) is large enough, the image component $JI_2$ (which is not diffracted out) has less contribution to the side viewing image $I_4$ than that of the image component $kI_1$. Thus, the difference between the side viewing image $I_4$ and the normal viewing image $I_1$ can be reduced, thereby improving the image quality of the side viewing image $I_4$. It is worthy to be noted that the difference between the images $I_3$ and $I_4$ represents the differences between the brightness, hue, and saturation of the same pixels observed with different viewing angles, and less difference between the images means better image quality uniformity for the different viewing angles.

Although the display device 100 provided by the present invention has better image quality uniformity for viewing angles, the display device 100 does not have good performance when displaying a dark state image. In the display device 100, the diffraction plate may diffract the normal viewing image to the side viewing image for overcoming the defect of the side viewing image, but the side viewing image may also be diffracted to the normal viewing image by the diffraction plate and be interfered. Such a phenomenon is relatively apparent when a dark state image is shown on the display device 100, it is because light leakage almost doesn't happen along a normal viewing angle or an absorption axis of a polarizer from the LCD, and may only happen along an oblique direction of the polarizer. However, for the display device 100, the user may perceive a light leakage phenomenon (i.e. poor dark state effect) along the normal viewing angle or the absorption axis of the polarizer due to the light diffracted from the side viewing angle. Therefore, other embodiments of the present invention are to make improvements on the display device 100 for providing an LCD with better dark state performance.

It is worthy to be noted that the following embodiments will discuss the corresponding relationships among polarizer, diffraction plate and brightness enhancement film (for brief explanation, only the brightness enhancement film is rotated and the polarizer and the diffraction plate are fixed.) for providing an LCD with better dark state performance. The experiment results of the following embodiments are obtained merely by using the polarizer, the diffraction plate, the brightness enhancement film and a light source, but those skilled in the art may understand that the light leakage of the display at dark state is mainly caused by the oblique light passing through the polarizers with the light absorption axes set cross, so that the experiment results obtained from the experiments made in the embodiments are applicable to a complete LCD structure.

Second Embodiment

Figure 3:
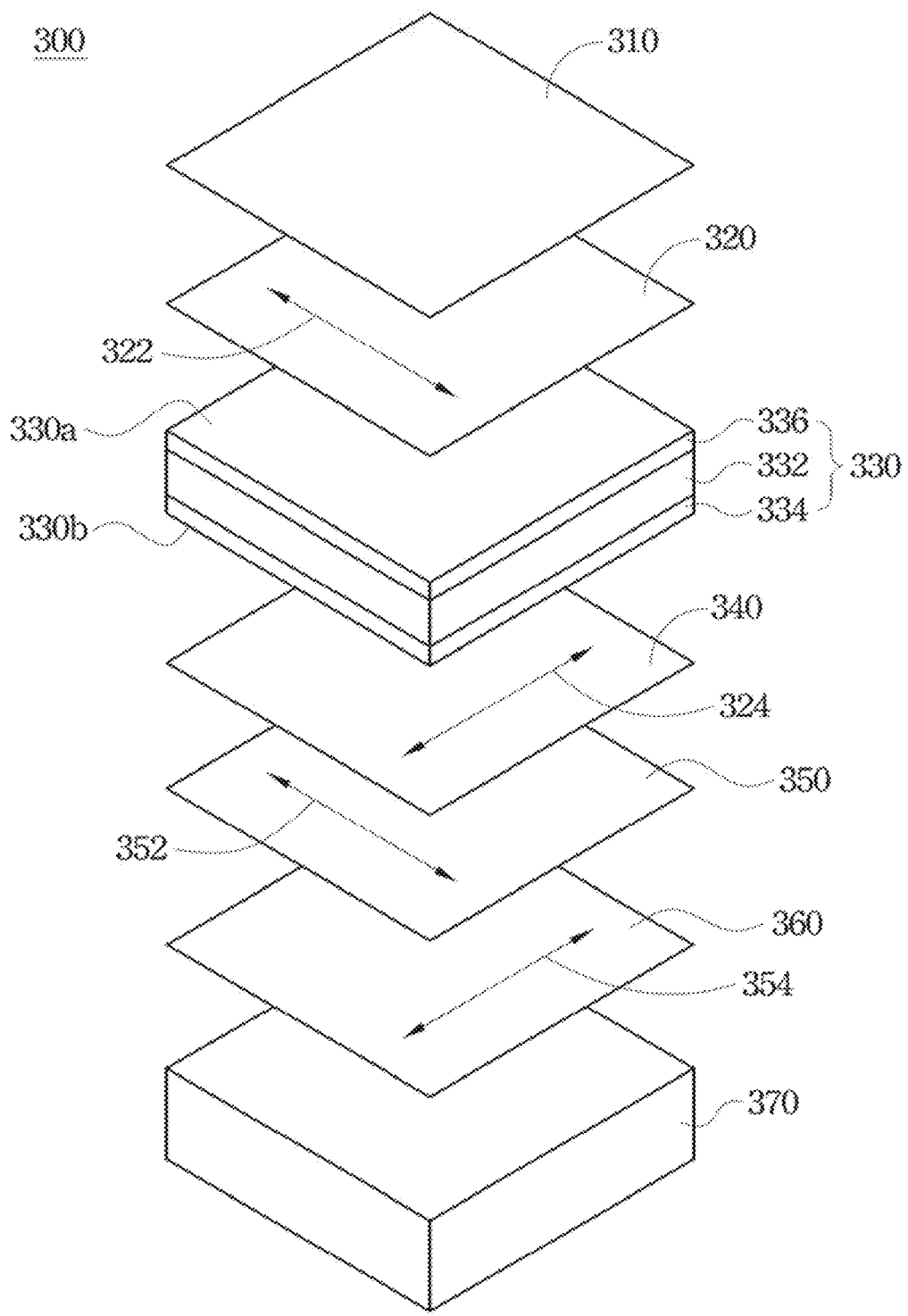
FIG. 3 is a schematic structure diagram of an LCD in accordance with the second embodiment of the present invention.

Referring to FIG. 3, FIG. 3 is a schematic structure diagram of an LCD 300 in accordance with another embodiment of the present invention. The LCD 300 is a VA LCD, and includes a diffraction plate 310, a first polarizer 320, an liquid crystal panel 330, a second polarizer 340, a first brightness enhancement film 350, a second brightness enhancement film 360 and a backlight module 370. In the present embodiment, the liquid crystal panel 330 is formed from a liquid crystal layer 332, a thin film transistor substrate 334 and a color filter 336, but embodiments of the present invention are not limited thereto.

The diffraction plate 310 and the first polarizer 320 are disposed above a surface 330a of the liquid crystal panel 330, and the first polarizer 320 is disposed between the diffraction plate 310 and the liquid crystal panel 330. The second polarizer 340, the first brightness enhancement film 350, the second brightness enhancement film 360 and the backlight module 370 are disposed below a surface 330b of the liquid crystal panel 330, wherein the surface 330a is opposite to the surface 330b. Further, as described in the first embodiment, the diffraction plate 310 can also be disposed between the first polarizer 320 and the liquid crystal panel 330.

The first polarizer 320 and the second polarizer 340 have respective light absorption axes 322 and 324 which are substantially perpendicular to each other. The first brightness enhancement film 350 and the second brightness enhancement film 360 have respective light-collecting directions 352 and 354 which are substantially perpendicular to each other.

Figure 3A:
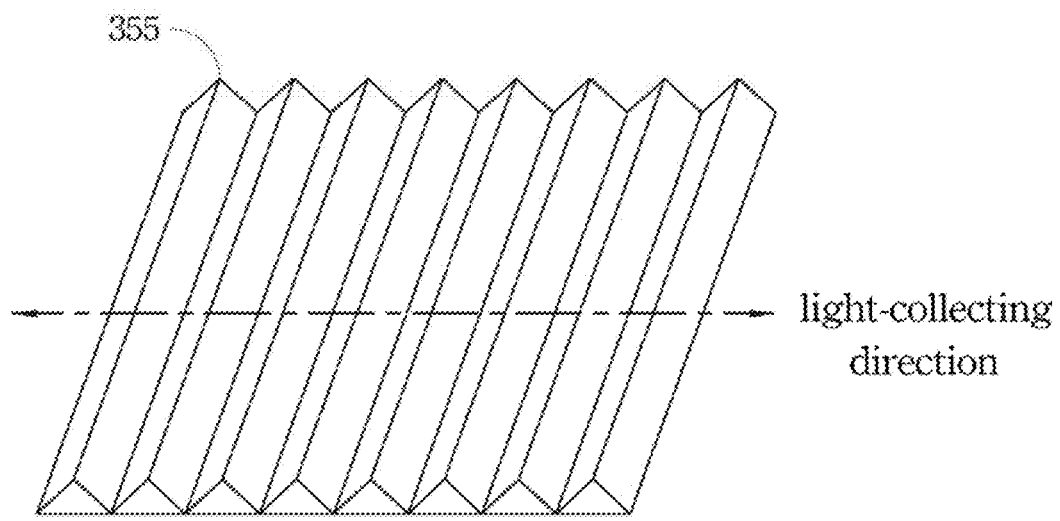
FIG. 3a is a schematic structure diagram of a brightness enhancement film in accordance with the second embodiment of the present invention.

Referring to FIG. 3a, FIG. 3a is a schematic structure diagram of the brightness enhancement film in accordance with the embodiment of the present invention. The light-collecting direction of the brightness enhancement film is determined by the direction of pattern structure (i.e. the extending direction of ridges or trenches) formed on the brightness enhancement film. For example, when the extending direction of the pattern structure 355 (ridges or trenches) is in a vertical direction (i.e. the y-axis direction of the x-y plane), the light-collecting direction is in a horizontal direction (i.e. the x-axis direction of the x-y plane). When the extending direction of the pattern structure (ridges or trenches) is in a horizontal direction (i.e. the x-axis direction of the x-y plane), the light-collecting direction is in a vertical direction (i.e. the y-axis direction of the x-y plane). Accordingly, the light-collecting direction defined in embodiments of the present invention is perpendicular to the direction of the pattern structure of the brightness enhancement film. Further, in another embodiment of the present invention, the brightness enhancement film may include two or more pattern structures, and in this case, the light-collecting direction may be determined by averaging the directions of the pattern structures. For example, when the brightness enhancement film includes the pattern structures of 85 degrees and 95 degrees at the same time, the averaged pattern structure thereof is a pattern structure of 90 degrees, and thus the light-collecting direction thereof is defined to be in the direction of 180 degrees.

Figure 3B:
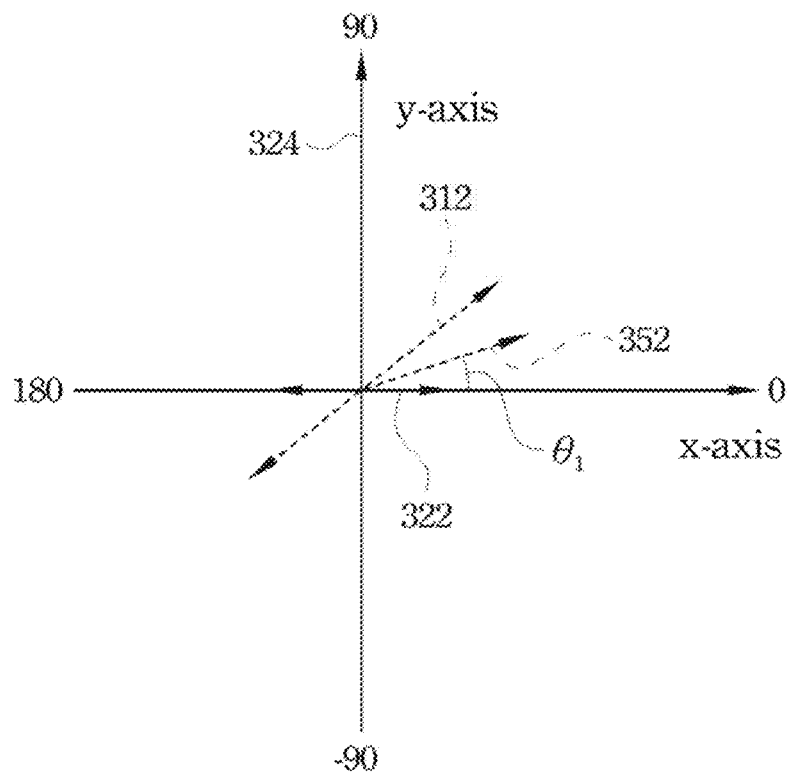
FIG. 3b is a schematic diagram showing the relationships among light absorption axes of polarizers, a diffractive direction of a diffraction plate, and a light-collecting direction of a first brightness enhancement film in accordance with the second embodiment of the present invention.

Referring to FIG. 3b, FIG. 3b is a schematic diagram showing the relationships among the light absorption axes 322 and 324 of the polarizers, the diffractive direction 312 of the diffraction plate 310, and the light-collecting direction 352 of the first brightness enhancement film 350, wherein the x-axis is a reference coordinate axis. For example, the light absorption axis 322 of the first polarizer 320 represents the directions of 0 degree and 180 degrees, and the light absorption axis 324 of the second polarizer 340 represents the directions of 90 degrees and −90 degrees. In the present invention, the diffractive direction 312 is in the direction of 45 degrees, and an included angle $\theta_1$ is between the light-collecting axis 352 of the first brightness enhancement film 350 and the light absorption axis 322 of the first polarizer 320, wherein $\theta_1$ is a variable.

Figure 3C:
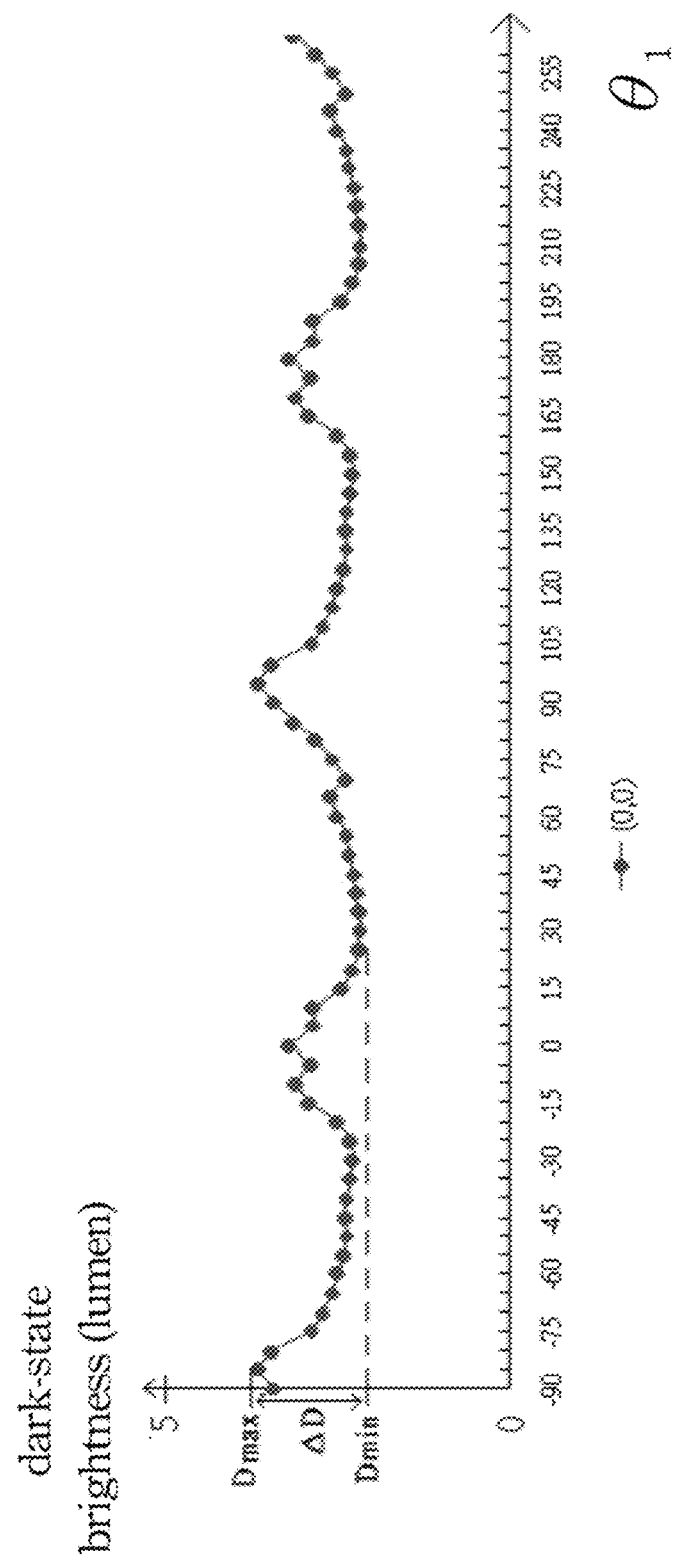
FIG. 3c illustrates a curve of dark-state brightness versus $\theta_1$ in accordance with the second embodiment of the present invention.

Referring to FIG. 3c, FIG. 3c illustrates a curve of brightness at dark-state versus angle $\theta_1$ (equivalent to a rotation angle of the brightness enhancement film (BEF)), wherein $D_{max}$ stands for the maximum brightness value; $D_{min}$ stands for the minimum brightness value; and $\Delta D$ stands for the difference between $D_{max}$ and $D_{min}$. From FIG. 3c, it can be known that if $\frac{1}{2}\Delta D$ is used as a dark-state standard (i.e. the tolerable range of brightness at dark-state is from $D_{min}$ to $D_{min}+\frac{1}{2}*\Delta D$), it is found that the LCD 300 has better dark-state performance when $\theta_1$ is from −75 degrees to −20 degrees or from 5 degrees to 80 degrees. That is, under the condition of the fixed light absorption axis of the polarizer, when the included angle between the diffractive direction 312 and the light-collecting direction 352 of the first brightness enhancement film 350 (i.e. the difference of the angle along the light-collecting direction 352 minus the angle along the diffractive direction 312 for example, when $\theta_1$ is from −75 degrees to −20 degrees or from 5 degrees to 80 degrees, the angle between the diffractive direction 312 and the light-collecting direction 352 is ($\theta_1$−45) degrees) is from −120 degrees to −65 degrees or from −40 degrees to 35 degrees, the LCD 300 has better dark-state performance.

Further, if $\frac{1}{4}\Delta D$ is used as the dark-state standard (i.e. the tolerable range of brightness at dark-state is from $D_{min}$ to $D_{min}+\frac{1}{4}*\Delta D$), it can be found that, when $\theta_1$ is from −60 degrees to −20 degrees or from 15 degrees to 60 degrees, the LCD 300 has better dark-state performance and at the same time the included angle between the diffractive direction 312 and the light-collecting direction 352 of the first brightness enhancement film 350 is from −105 degrees to −65 degrees or from −30 degrees to −15 degrees. Further, if $\frac{1}{8}\Delta D$ is used as the dark-state standard (i.e. the tolerable range of brightness at dark-state is from $D_{min}$ to $D_{min}+\frac{1}{8}*\Delta D$), it can be found that, the LCD 300 has better dark-state performance when $\theta_1$ is from −40 degrees to −25 degrees or from 20 degrees to 55 degrees, and meanwhile, the angle between the diffractive direction 312 and the light-collecting direction 352 is from −85 degrees to −70 degrees or from −25 degrees to 10 degrees.

However, for human eyes, taking $\frac{1}{2}\Delta D$ as the dark-state standard is enough for the user not to sense apparent dark-state differences, and thus $\frac{1}{2}\Delta D$ is used as the dark-state standard of the LCD of the present embodiment.

Further, in the present embodiment, if the affect of the included angle between the light-collecting direction 352 and the light absorption axis 322 on the dark-state light leakage issue is considered, since $\theta_1$ is the angle included between the light-collecting axis 352 and the light absorption axis 322, the LCD 300 has better dark-state performance when the angle between the light absorption axis 322 and the light-collecting direction 352 (the difference of the angle along the light-collecting direction 352 minus the angle along the light absorption direction 322) is from −75 degrees to −20 degrees or from 5 degrees to 80 degrees.

Figure 4A:
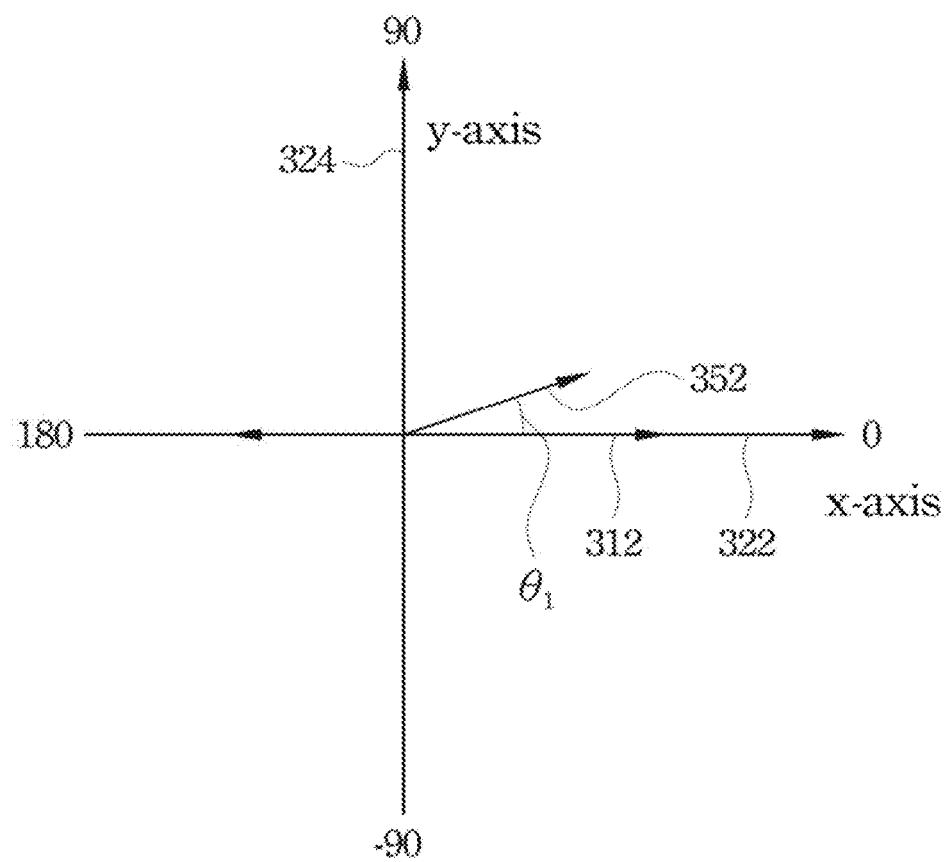
FIG. 4a is a schematic diagram showing the relationships among the light absorption axes of the polarizers, the diffractive direction of the diffraction plate, and the light-collecting direction of the first brightness enhancement film in accordance with the second embodiment of the present invention.

It is worthy to be noted that, when the diffractive direction of the diffraction plate 310 is changed, the aforementioned angle range which can enable the LCD to have better dark-state performance is also changed. For example, referring to FIG. 4a, FIG. 4a is a schematic diagram showing the relationships among the light absorption axes 322 and 324 of the polarizers, the diffractive direction 312 of the diffraction plate 310 and the light-collecting direction 352 of the first brightness enhancement film 350, wherein the diffractive direction 312 of the diffraction plate 310 is 0 degree. When the diffractive direction 312 of the diffraction plate 310 becomes 0 degree, the dark-state brightness of the respective angles $\theta_1$ (equivalent to rotation angles of the BEF) of the LCD 300 are shown in FIG. 4b.

Figure 4B:
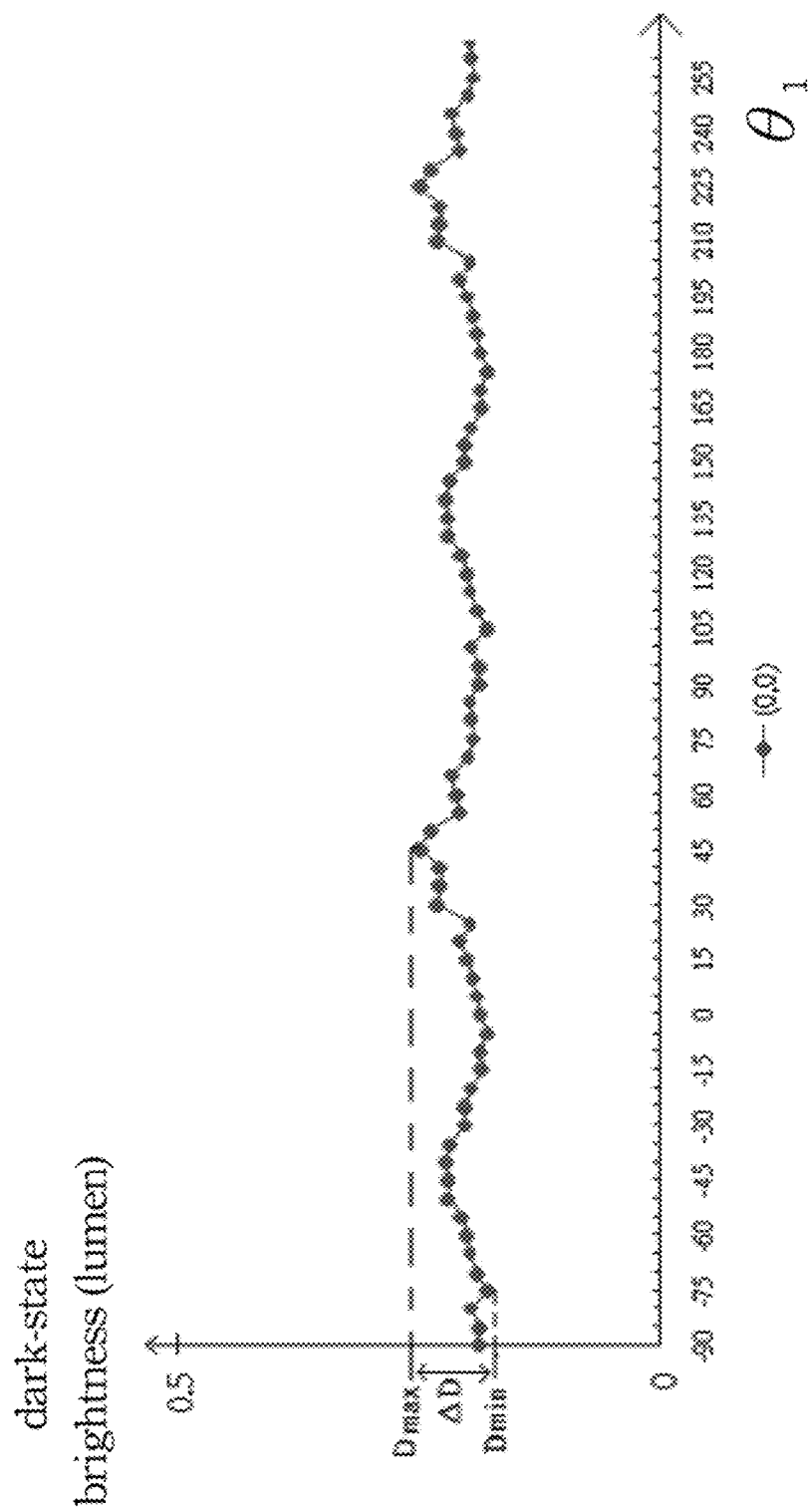
FIG. 4b illustrates a curve of dark-state brightness versus $\theta_1$ in accordance with the second embodiment of the present invention.

From FIG. 4b, it can be known that if ½ΔD is used as the dark-state standard, it is found that the LCD 300 has better dark-state performance when $\theta_1$ is from −30 degrees to 25 degrees or from 55 degrees to 125 degrees, and meanwhile, the angle between the diffractive direction 312 and the light-collecting direction 352 of the brightness enhancement film is from −30 degrees to 25 degrees or from 55 degrees to 125 degrees. Further, if ¼ΔD is used as the dark-state standard, it can be found that the LCD 300 has better dark-state performance when $\theta_1$ is from −20 degrees to 10 degree, and meanwhile the angle between the diffractive direction 312 and the light-collecting direction 352 of the brightness enhancement film is from −20 degrees to 10 degree. Further, if ⅛ΔD is used as the dark-state standard, it can be found that the LCD 300 has better dark-state performance when $\theta_1$ is from −15 degrees to 0 degree, and meanwhile the angle between the diffractive direction 312 and the light-collecting direction 352 of the brightness enhancement film is from −15 degrees to 0 degree.

Further, in the embodiment in which the diffractive direction 312 is set n the direction of 0 degree, if the affect of the angle between the light-collecting direction 352 and the light absorption axis 322 on the dark-state light leakage is considered, since $\theta_1$ s the included angle between the light-collecting axis 352 and the light absorption axis 322, the LCD 300 has better dark-state performance when the angle between the light absorption axis 322 and the light-collecting direction 352 (the difference of the angle along the light-collecting direction 352 minus the angle along the light absorption direction 322) is from −30 degrees to 25 degrees or from 55 degrees to 125 degrees.

In another embodiment of the present invention, the diffraction plate 310 may have two diffractive directions such as a first diffractive direction and a second diffractive direction, and the included angle between the first diffractive direction and the light absorption axis 322 of the first polarizer is 45 degrees and the included angle between the second diffractive direction and the light absorption axis 322 of the first polarizer is 0 degree, thereby enabling the LCD to have better image quality uniformity for the viewing angles. Meanwhile, the angle between the light absorption axis 322 and the light-collecting direction 352 can be from −30 degrees to −20 degrees or from 55 degrees to 80 degrees to improve the dark-state performance of the LCD. Further, the brightness distribution trend at dark-state with the angle of 45 degrees between the diffractive direction and the light absorption axis is similar to that with the angle of −45 degrees therebetween, and the distribution trend of the brightness at dark-state with the included angle of 0 degree between the diffractive direction and the light absorption axis is similar to that of the angle of 90 degrees therebetween, and thus analogously, the angle along the first or second diffractive direction can be selected from one of 45/−45 degrees or from one of 0/90 degrees.

Third Embodiment

Figure 5:
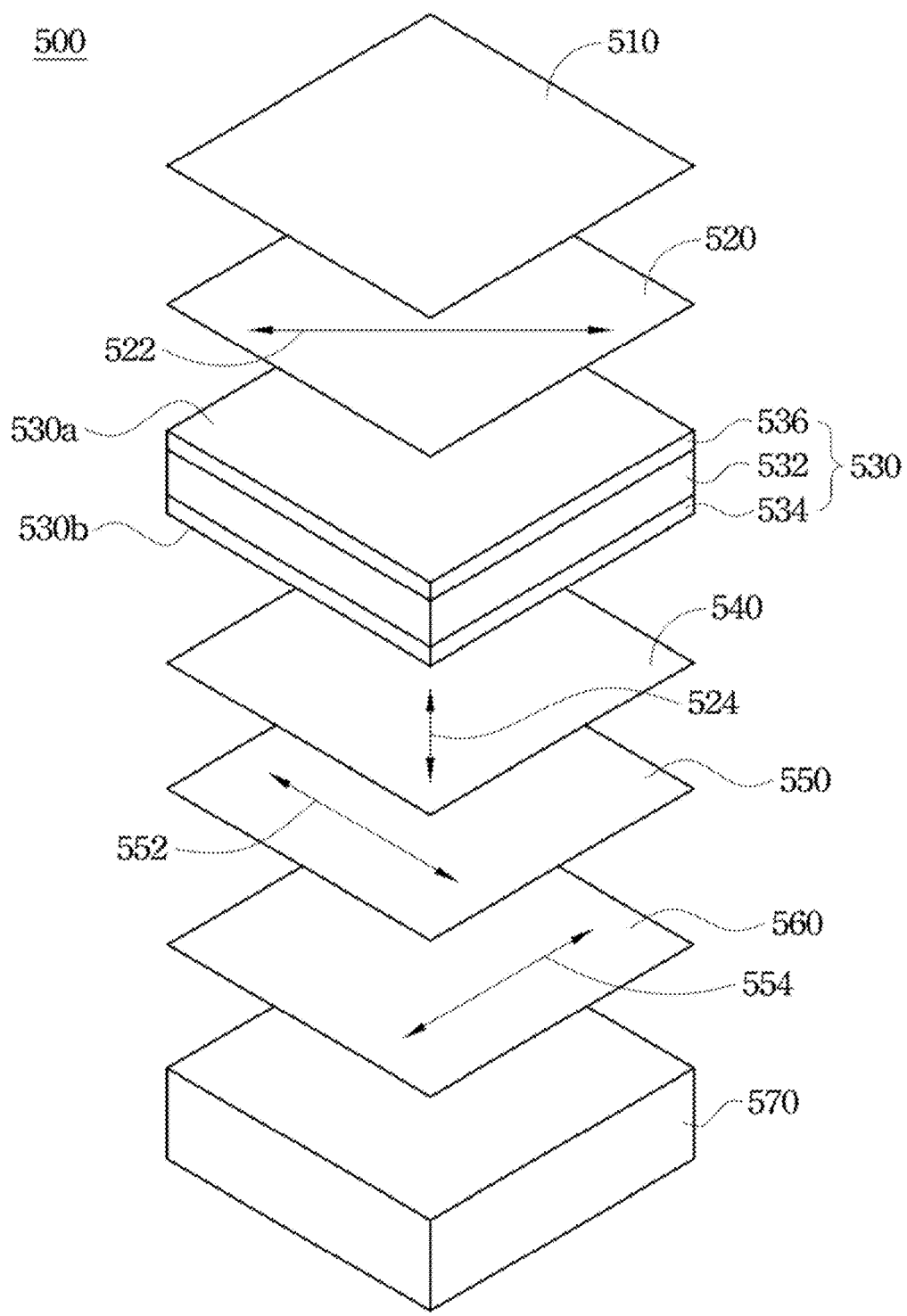
FIG. 5 is a schematic structure diagram of an LCD in accordance with a third embodiment of the present invention.

Referring to FIG. 5, FIG. 5 is a schematic structure diagram of an LCD 500 in accordance with another embodiment of the present invention. The LCD 500 is a TN LCD, and includes a diffraction plate 510, a first polarizer 520, an liquid crystal panel 530, a second polarizer 540, a first brightness enhancement film 550, a second brightness enhancement film 560 and a backlight module 570. In the present embodiment, the liquid crystal panel 530 is formed from a liquid crystal layer 532, a thin film transistor substrate 534 and a color filter 536, but embodiments of the present invention are not limited thereto.

The diffraction plate 510 and the first polarizer 520 are disposed above a surface 530a of the liquid crystal panel 530, and the first polarizer 520 is disposed between the diffraction plate 510 and the liquid crystal panel 530. The second polarizer 540, the first brightness enhancement film 550, the second brightness enhancement film 560 and the backlight module 570 are disposed below a surface 530b of the liquid crystal panel 530, wherein the surface 530a is opposite to the surface 530b. Further, as described in the first embodiment, the diffraction plate 510 also can be disposed between the first polarizer 520 and the liquid crystal panel 530.

The first polarizer 520 and the second polarizer 540 have respective light absorption axes 522 and 524 which are substantially perpendicular to each other. The first brightness enhancement film 550 and the second brightness enhancement film 560 have respective light-collecting directions 552 and 554 which are substantially perpendicular to each other.

Figure 5A:
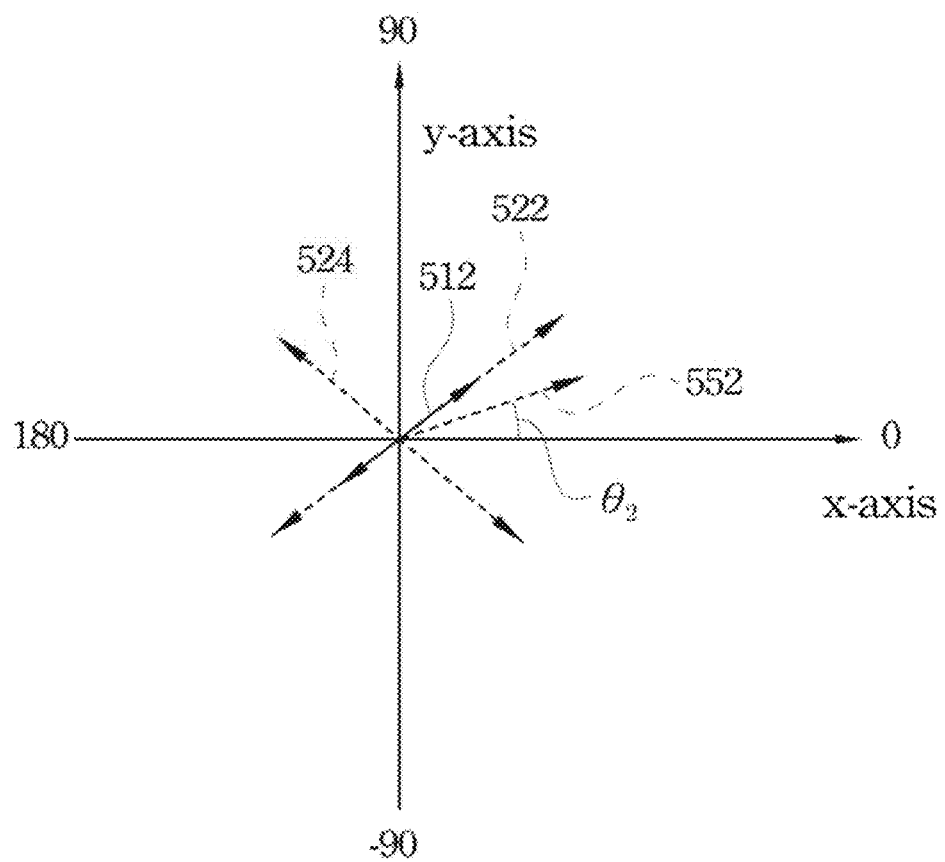
FIG. 5a is a schematic diagram showing the relationships among light absorption axes of polarizers, a diffractive direction of a diffraction plate, and a light-collecting direction of a first brightness enhancement film in accordance with the third embodiment of the present invention.

Referring to FIG. 5a, FIG. 5a is a schematic diagram showing the relationships among the light absorption axes 522 and 524 of the polarizers, the diffractive direction 512 of the diffraction plate 510, and the light-collecting direction 552 of the first brightness enhancement film 550, wherein the x-axis is a reference coordinate axis; the light absorption axis 522 of the first polarizer 520 is in the direction of 45 degrees; the light absorption axis 524 of the second polarizer 540 is in the direction of 135 degree and the diffractive direction 512 is in the direction of 45 degrees. In the present embodiment, an included angle $\theta_2$ is between the light-collecting axis 552 of the first brightness enhancement film 550 and the x-axis, wherein $\theta_2$ is a variable.

Figure 5B:
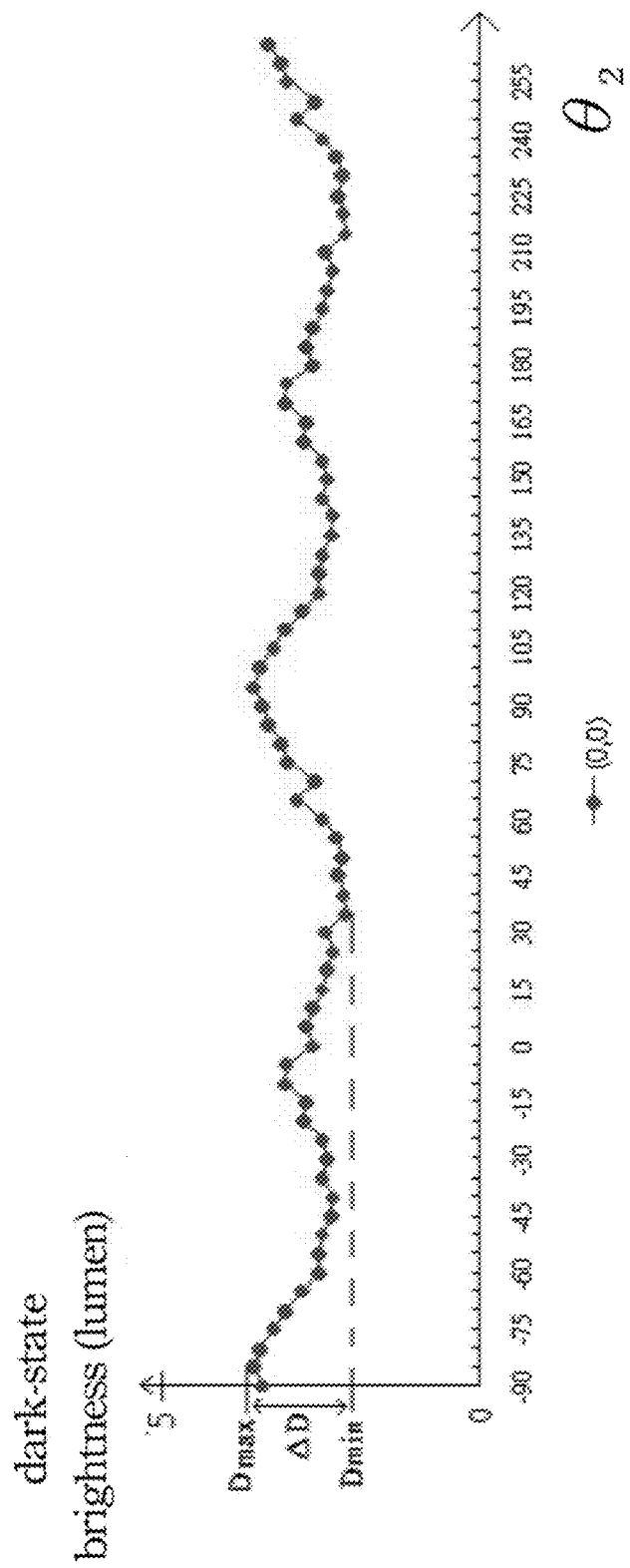
FIG. 5b illustrates a curve of dark-state brightness versus $\theta_2$ in accordance with the third embodiment of the present invention.

Referring to FIG. 5b, FIG. 5b illustrates a curve of brightness at dark-state versus angle $\theta_2$ (equivalent to a rotation angle of the brightness enhancement film (BEF)) of the LCD 500. From FIG. 5b, it can be known that if ½ΔD is used as the dark-state standard, it is found that the LCD 500 has better dark-state performance when $\theta_2$ is from −65 degrees to −15 degrees or from 0 degree to 70 degrees, and meanwhile the included angle between the diffractive direction 512 and the light-collecting direction 552 of the first brightness enhancement film 550 is from −110 degrees to −60 degrees or from −45 degrees to 25 degrees.

Further, if ¼ΔD is used as the dark-state standard, it can be found that, the LCD 500 has better dark-state performance when $\theta_2$ is from −50 degrees to −25 degrees or from 20 degrees to 60 degrees, and meanwhile the included angle between the diffractive direction 512 and the light-collecting direction 552 of the first brightness enhancement film 550 is from −95 degrees to −70 degrees or from −25 degrees to 15 degrees.

However, for human eyes, the use of ½ΔD as the dark-state standard is enough for the user not to sense apparent dark-state changes, and thus ½ΔD is used as the dark-state standard of the LCD of the present embodiment.

Further, in the present embodiment, if the affect of the included angle between the light-collecting direction 552 and the light absorption axis 522 on the dark-state light leakage is considered, it can be known from FIG. 5b that, the LCD 500 has better dark-state performance when the included angle between the light absorption axis 522 and the light-collecting direction 552 is from −110 degrees to −60 degrees or from −45 degrees to 25 degrees (when ½ΔD is used as the dark-state standard).

Figure 6A:
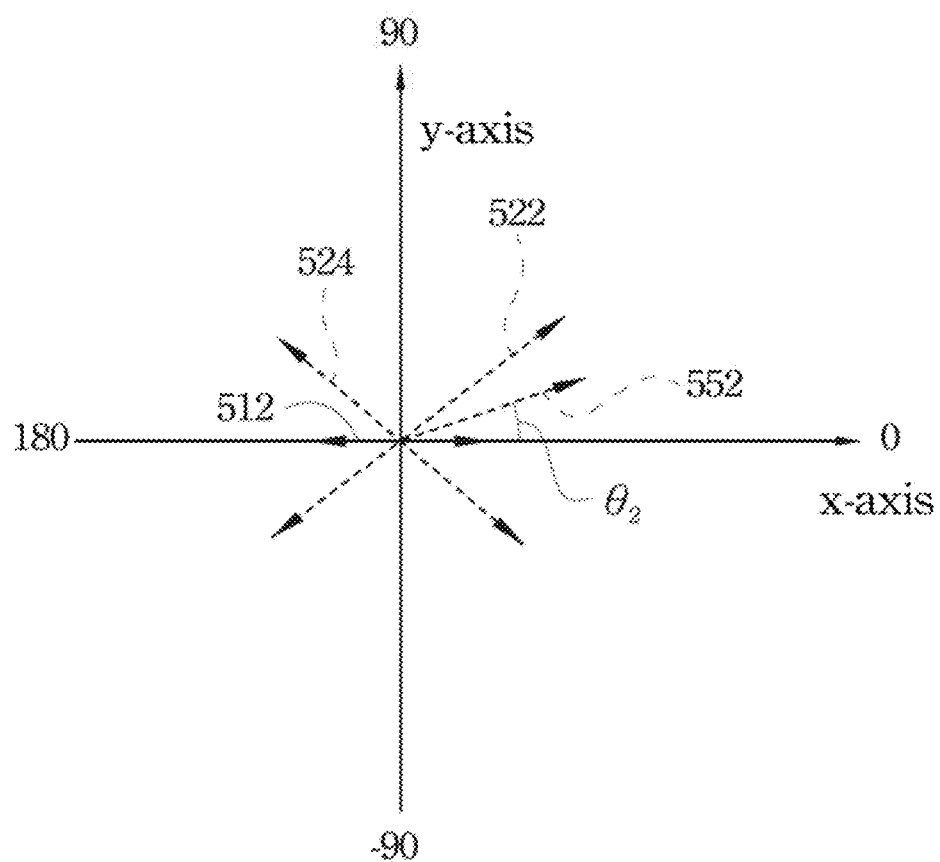
FIG. 6a is a schematic diagram showing the relationships among the light absorption axes of the polarizers, the diffractive direction of the diffraction plate, and the light-collecting direction of the first brightness enhancement film in accordance with the third embodiment of the present invention.

It is worthy to be noted that, when the diffractive direction of the diffraction plate 510 is changed, the aforementioned angle range which can enable the LCD to have better dark-state performance is also changed. For example, referring to FIG. 6a, FIG. 6a is a schematic diagram showing the relationships among the light absorption axes 522 and 524 of the polarizers, the diffractive direction 512 of the diffraction plate 510 and the light-collecting direction 552 of the first brightness enhancement film 550, wherein the diffractive direction 512 of the diffraction plate 510 is 0 degree. When the diffractive direction 512 of the diffraction plate 510 becomes 0 degree, the dark-state brightness of the respective angles $\theta_2$ (equivalent to rotation angles of the BEF) of the LCD 500 are shown in FIG. 6b.

Figure 6B:
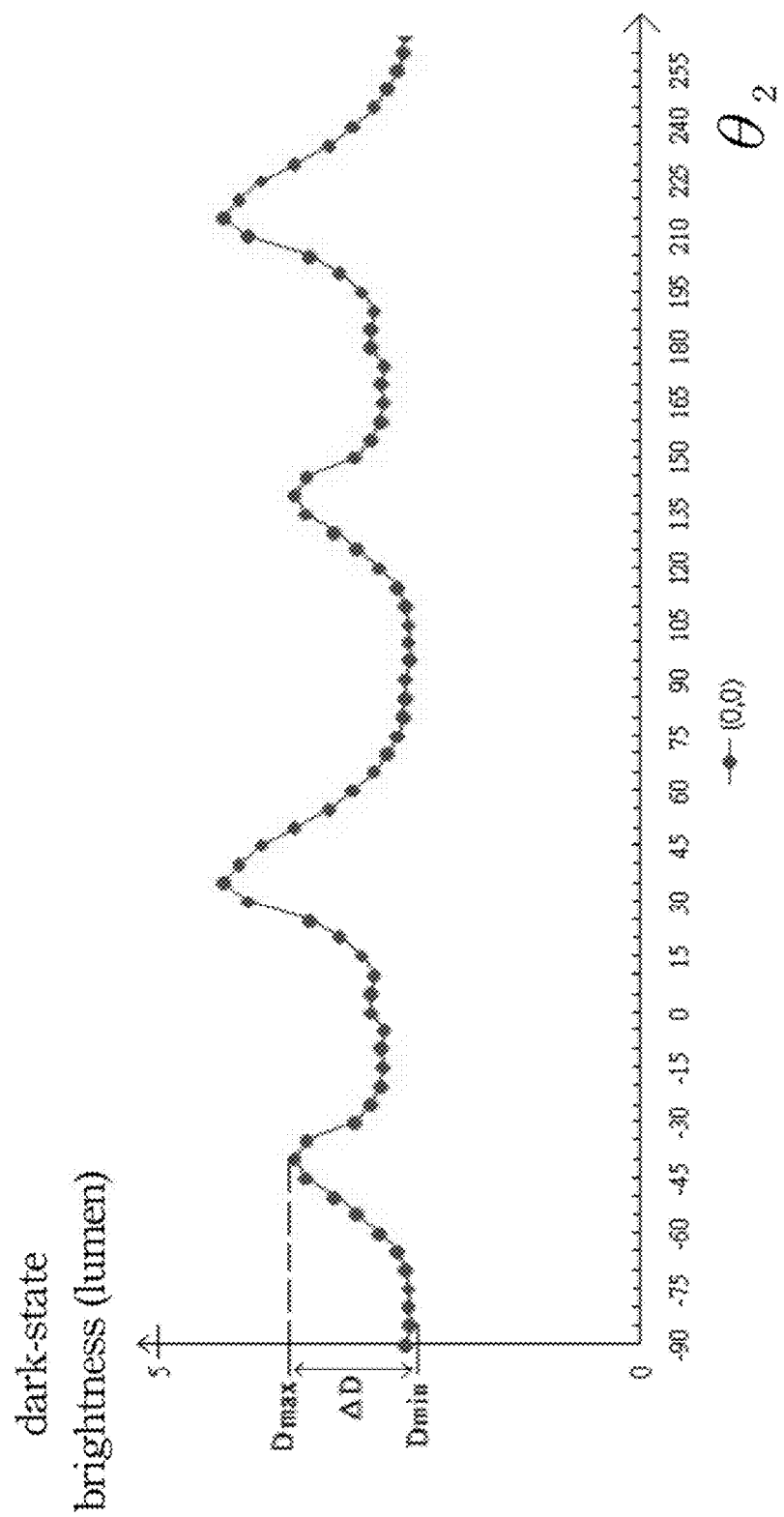
FIG. 6b illustrates a curve of dark-state brightness versus $\theta_2$ in accordance with the third embodiment of the present invention.

From FIG. 6b, it can be known that if ½ΔD is used as the dark-state standard, it is found that the LCD 500 has better dark-state performance when $\theta_2$ is from −30 degrees to 20 degrees or from 55 degrees to 130 degrees, and meanwhile, the angle between the diffractive direction 512 and the light-collecting direction 552 of the brightness enhancement film is from −30 degrees to 20 degrees or from 55 degrees to 130 degrees (the diffractive direction is 0 degree). Further, if ¼ΔD is used as the dark-state standard, it can be found that the LCD 500 has better dark-state performance when $\theta_2$ is from −25 degrees to 10 degrees, and meanwhile the angle between the diffractive direction 512 and the light-collecting direction 552 of the brightness enhancement film is from −25 degrees to 10 degrees. Further, ⅛ΔD is used as the dark-state standard, it can be found that the LCD 500 has better dark-state performance when $\theta_2$ from 70 degrees to 115 degrees, and meanwhile the angle between the diffractive direction 512 and the light-collecting direction 552 of the brightness enhancement film is from 70 degrees to 115 degrees.

Further, in the embodiment in which the diffractive direction 512 is set in the direction of 0 degree, if the affect of the included angle between the light-collecting direction 552 and the light absorption axis 522 on the dark-state light leakage is considered, it can be known from FIG. 6b that, the LCD 500 has better dark-state performance when the angle between the light absorption axis 522 and the light-collecting direction 552 is from −75 degrees to −25 degrees or from 10 degrees to 85 degrees (when ½ΔD is used as the dark-state standard). In another embodiment of the present invention, the diffraction plate 510 may have two diffractive directions such as a first diffractive direction and a second diffractive direction, and the angle between the first diffractive direction and the light absorption axis 522 of the first polarizer is 45 degree, and the angle between the second diffractive direction and the light absorption axis 522 of the first polarizer is 0 degrees, thereby enabling the LCD 500 to have better age quality uniformity for the viewing angles. Meanwhile, the angle between the light absorption axis 522 and the light-collecting direction 552 can be from −75 degrees to −60 degrees or from 10 degrees to 25 degrees to improve the dark-state performance of the LCD. Further, the distribution trend of the brightness at dark-state with the included angle of 45 degrees between the diffractive direction and the light absorption axis is similar to that of the angle of −45 degrees therebetween, and the distribution trend of the brightness at dark-state with the included angle of 0 degree between the diffractive direction and the light absorption axis is similar to that with the angle of 90 degrees therebetween, and thus analogously, the angle along the first or second diffractive direction can be selected from 45/−45 degrees or from 0/90 degrees.

It can be known from the above that, the second and third embodiments provide the designs of the angular relationship between the light-collecting direction of the brightness enhancement film and the light diffractive direction of the diffraction plate for improving the dark-state light leakage along the normal viewing angle with respect to VA and TN LCDs respectively. However, if the type of LCD is not limited (to VA or TN or the diffractive direction of the diffraction plate (0 or 45 degrees)), the angle between the diffractive direction of the diffraction plate and the light-collecting direction of the brightness enhancement film can be an intersection of the aforementioned preferred angle ranges, i.e. from −110 degrees to −65 degrees and from −30 degrees to 20 degrees. For example, the diffractive direction of the diffraction plate can substantially perpendicular (about 90 degrees) or parallel (about 0 degree) to the light-collecting direction of the brightness enhancement film. Further, for the diffraction plate with two diffractive directions, such as the LCD in which respective angles of two diffractive directions relative to the light absorption axis of the first polarizer are 45/−45 degrees or 0/90 degrees, the angles included between the light absorption axis of the first polarizer and the light-collecting direction of the first brightness enhancement film can selected from one of the angle range from −30 degrees to −20 degrees: from −75 degrees to −60 degrees; from 55 degrees to 80 degrees; or from 10 degrees to 25 degrees.

Fourth Embodiment

Figure 7:
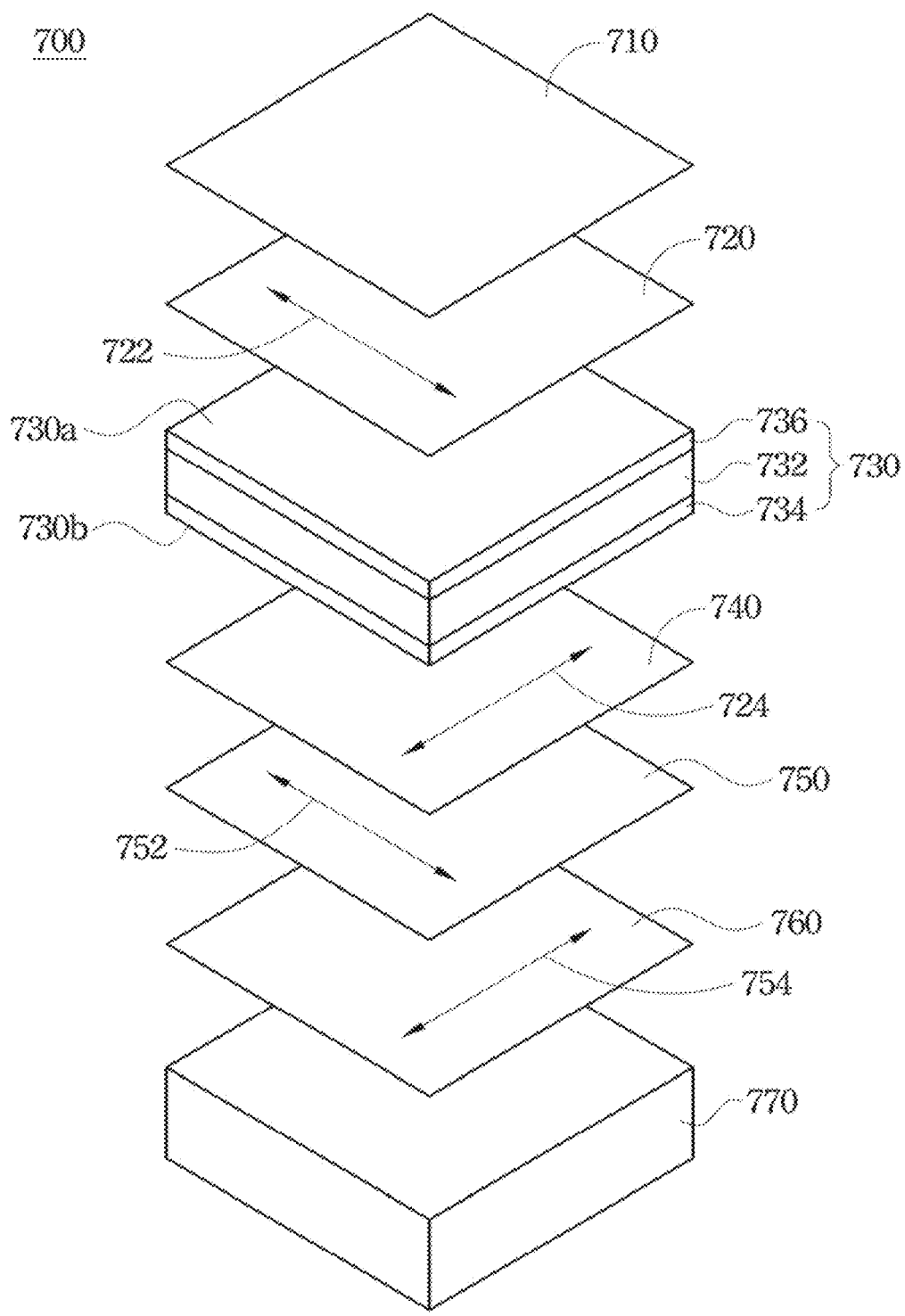
FIG. 7 is a schematic structure diagram of an LCD in accordance with a fourth embodiment of the present invention.

Referring to FIG. 7, FIG. 7 is a schematic structure diagram of an LCD 700 in accordance with another embodiment of the present invention. The LCD 700 is a VA LCD, and includes a diffraction plate 710, a first polarizer 720, an liquid crystal panel 730, a second polarizer 740, a first brightness enhancement film 750, a second brightness enhancement film 760 and a backlight module 770. In the present embodiment, the liquid crystal panel 730 is formed from a liquid crystal layer 732, a thin film transistor substrate 734 and a color filter 736, but embodiments of the present invention are not limited thereto.

The diffraction plate 710 and the first polarizer 720 are disposed above a surface 730a of the liquid crystal panel 730, and the first polarizer 720 is disposed between the diffraction plate 710 and the liquid crystal panel 730. The second polarizer 740, the first brightness enhancement film 750, the second brightness enhancement film 760 and the backlight module 770 are disposed below a surface 730b of the liquid crystal panel 730, wherein the surface 730a is opposite to the surface 730b. Further, as described in the first embodiment, the diffraction plate 710 also can be disposed between the first polarizer 720 and the liquid crystal panel 730.

The first polarizer 720 and the second polarizer 740 have respective light absorption axes 722 and 724 which are substantially perpendicular to each other. The first brightness enhancement film 750 and the second brightness enhancement film 760 have respective light-collecting directions 752 and 754 which are substantially perpendicular to each other.

Figure 7A:
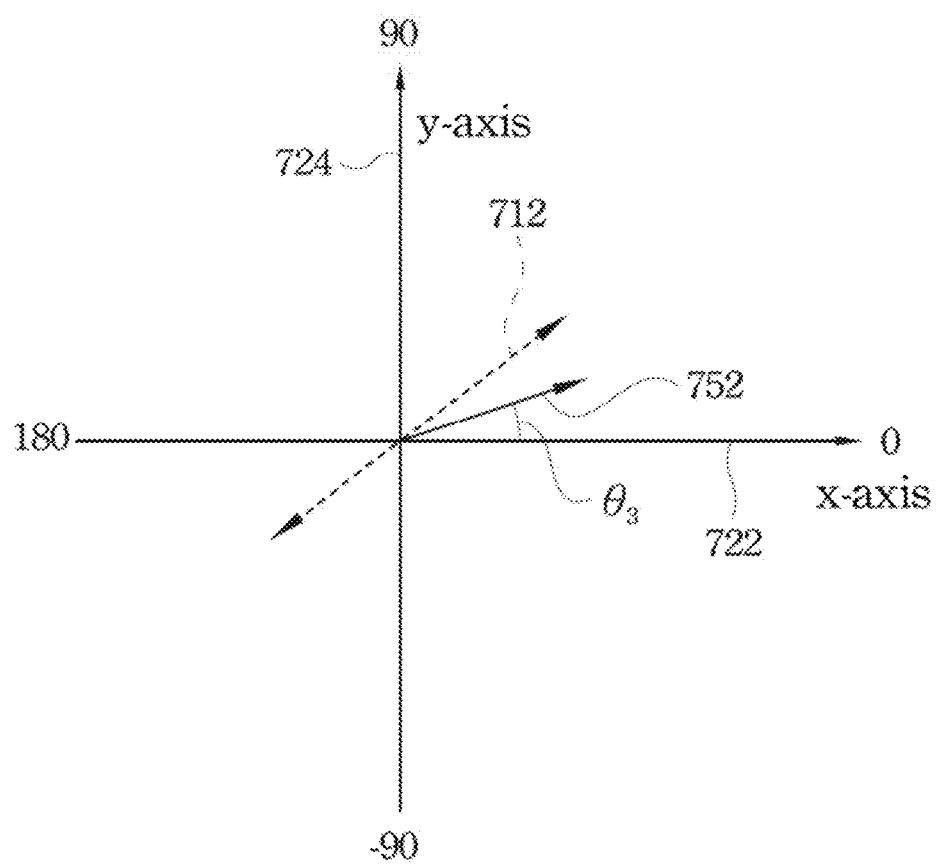
FIG. 7a is a schematic diagram showing the relationships among light absorption axes of polarizers, a diffractive direction of a diffraction plate, and a light-collecting direction of a first brightness enhancement film in accordance with the fourth embodiment of the present invention.

Referring to FIG. 7a, FIG. 7a is a schematic diagram showing the relationships among the light absorption axes 722 and 724 of the polarizers, the diffractive direction 712 of the diffraction plate 710, and the light-collecting direction 752 of the first brightness enhancement film 750, wherein the x-axis is a reference coordinate axis. For example, the light absorption axis 722 of the first polarizer 720 represents the directions of 0 degree and 180 degrees, and the light absorption axis 724 of the second polarizer 740 represents the directions of 90 degrees and −90 degrees. In the present invention, the diffractive direction 712 is in the direction of 45 degrees, and an angle $\theta_3$ is included between the light-collecting axis 752 of the first brightness enhancement film 750 and the light absorption axis 722 of the first polarizer 720, wherein $\theta_3$ is a variable.

Figure 7B:
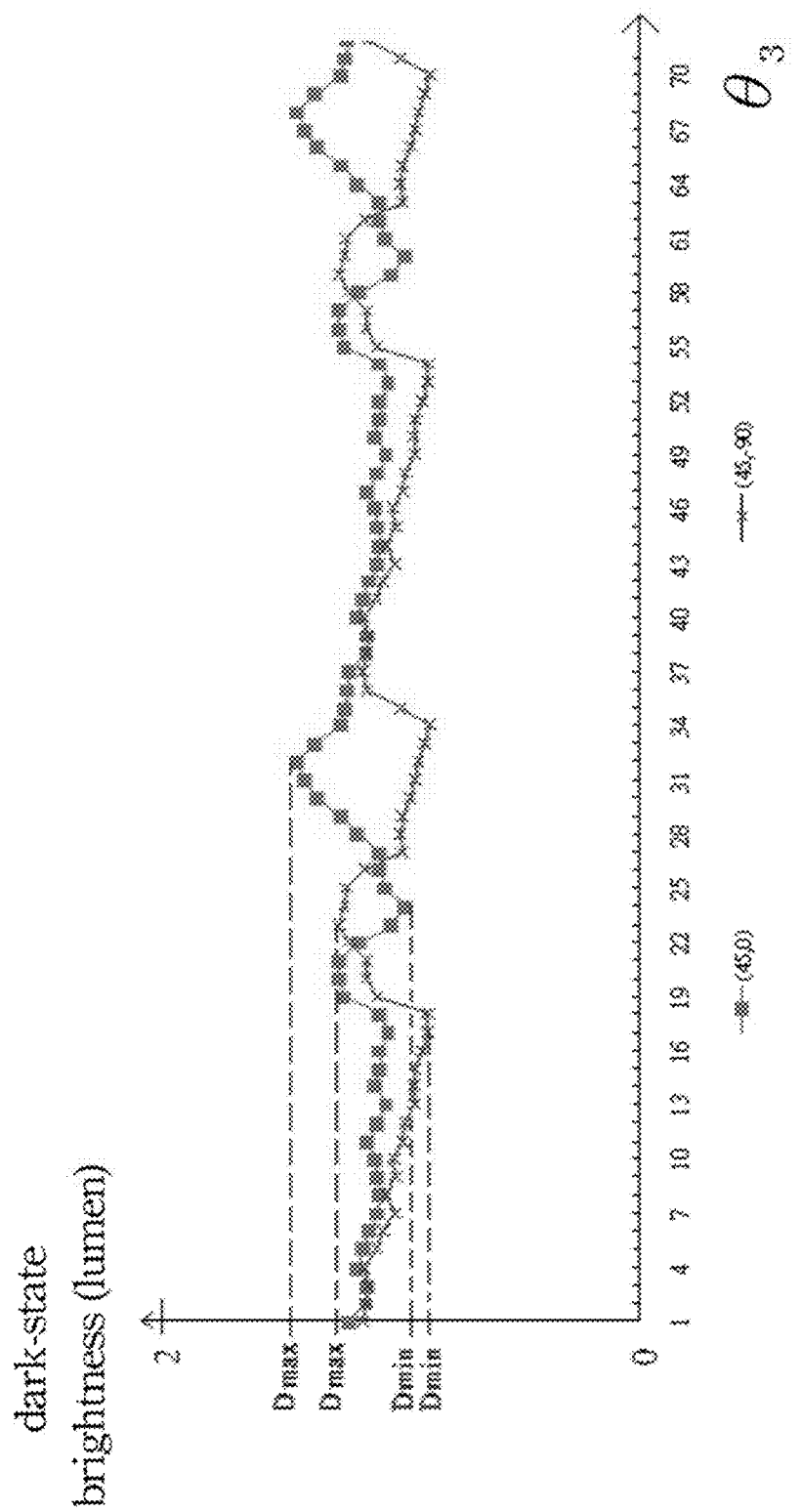
FIG. 7b illustrates a curve of dark-state brightness versus $\theta_3$ in accordance with the fourth embodiment of the present invention.

Referring to FIG. 7b, FIG. 7b illustrates a curve of the brightness at dark-state observed on the light absorption axis 722 of the first polarizer 720 versus angle $\theta_3$ (equivalent to a rotation angle of the brightness enhancement film (BEF)) of the LCD 700. That is, FIG. 7b shows the dark-state brightness observed at a zenithal angle of 45 degrees and an azimuthal angle of 0 degree, and the dark-state brightness observed at a zenithal angle of 45 degrees and an azimuthal angle of 270 degrees. In the present embodiment, the dark-state leakage changes along the light absorption axis of the polarizer will be discussed, wherein the zenithal angle of 45 degrees is used as a basis of observation since the commonly used range of the side viewing angle is about from the zenithal angle of 30 degrees to that of 60 degrees and an average value thereof is adopted.

At first, the dark-state brightness observed at the zenithal angle of 45 degrees and the azimuthal angle of 0 degree is considered. From FIG. 7b, it can be known that if ½ΔD is used as the dark-state standard, it is found that the LCD 700 has better dark-state performance when $\theta_3$ from 15 degrees to 45 degrees or from −5 degrees to −90 degrees. That is, under the condition that the light absorption axis of the polarizer is fixed, and when the angle between the diffractive direction 712 and the light-collecting direction 752 of the first brightness enhancement film 750 is from −30 degrees to 0 degree or from −50 degrees to −135 degrees, the LCD 700 has better dark-state performance. Further, if ¼ΔD is used as the dark-state standard, it can be found that, the LCD 700 has better dark-state performance when $\theta_3$ is from 20 degrees to 35 degrees, and meanwhile the angle between the diffractive direction 712 and the light-collecting direction 752 of the first brightness enhancement film 750 is from −25 degrees to −10 degrees.

Then, the dark-state brightness observed at the zenithal angle of 45 degrees and the azimuthal angle of 270 degrees is considered. From FIG. 7b, it can be known that if ½ΔD is used as the dark-state standard, it is found that the LCD 700 has better dark-state performance when $\theta_3$ is from −5 degrees to −60 degrees or from 40 degrees to 80 degrees. That is, under the condition that the light absorption axis of the polarizer is fixed, and when the angle between the diffractive direction 712 and the light-collecting direction 752 of the first brightness enhancement film 750 is from −50 degrees to −105 degrees or from −5 degrees to 35 degrees, the LCD 700 has better dark-state performance.

However, for human eyes, the use of ½Δ D as the dark-state standard is enough for the user not to sense apparent dark-state changes, and thus ½ΔD is used as the dark-state standard of the LCD of the present embodiment.

Further, in the present embodiment, if the affect of the included angle between the light-collecting direction 752 and the light absorption axis 722 on the dark-state light leakage is considered, since $\theta_3$ is the included angle between the light-collecting axis 752 and the light absorption axis 722, the LCD 700 has better dark-state performance when the angle between the light absorption axis 722 and the light-collecting direction 752 is from 15 degrees to 45 degrees or from −5 degrees to 90 degrees (with respect to an observer at the zenithal angle of 45 degrees and the azimuthal angle of 0 degree); or is from −5 degrees to −60 degrees or from 40 degrees to 80 degrees (with respect to an observer at the zenithal angle of 45 degrees and the azimuthal angle of 270 degrees).

Figure 8A:
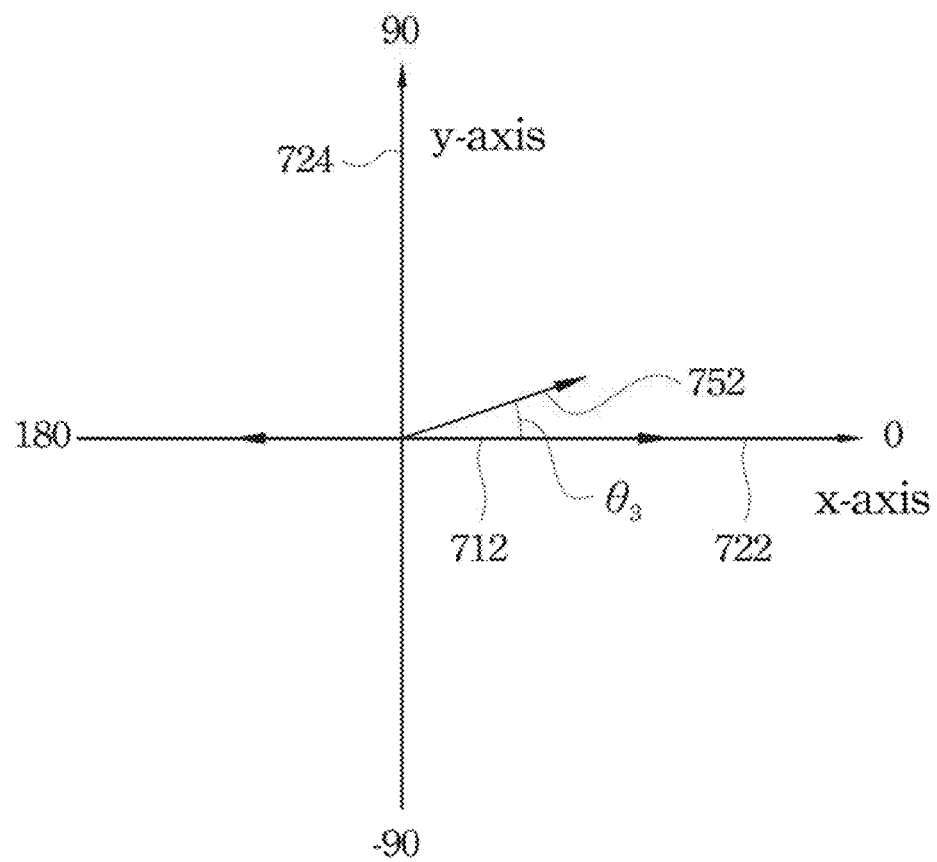
FIG. 8a is a schematic diagram showing the relationships among the light absorption axes of the polarizers, the diffractive direction of the diffraction plate, and the light-collecting direction of the first brightness enhancement film in accordance with the third embodiment of the present invention.
Figure 8B:
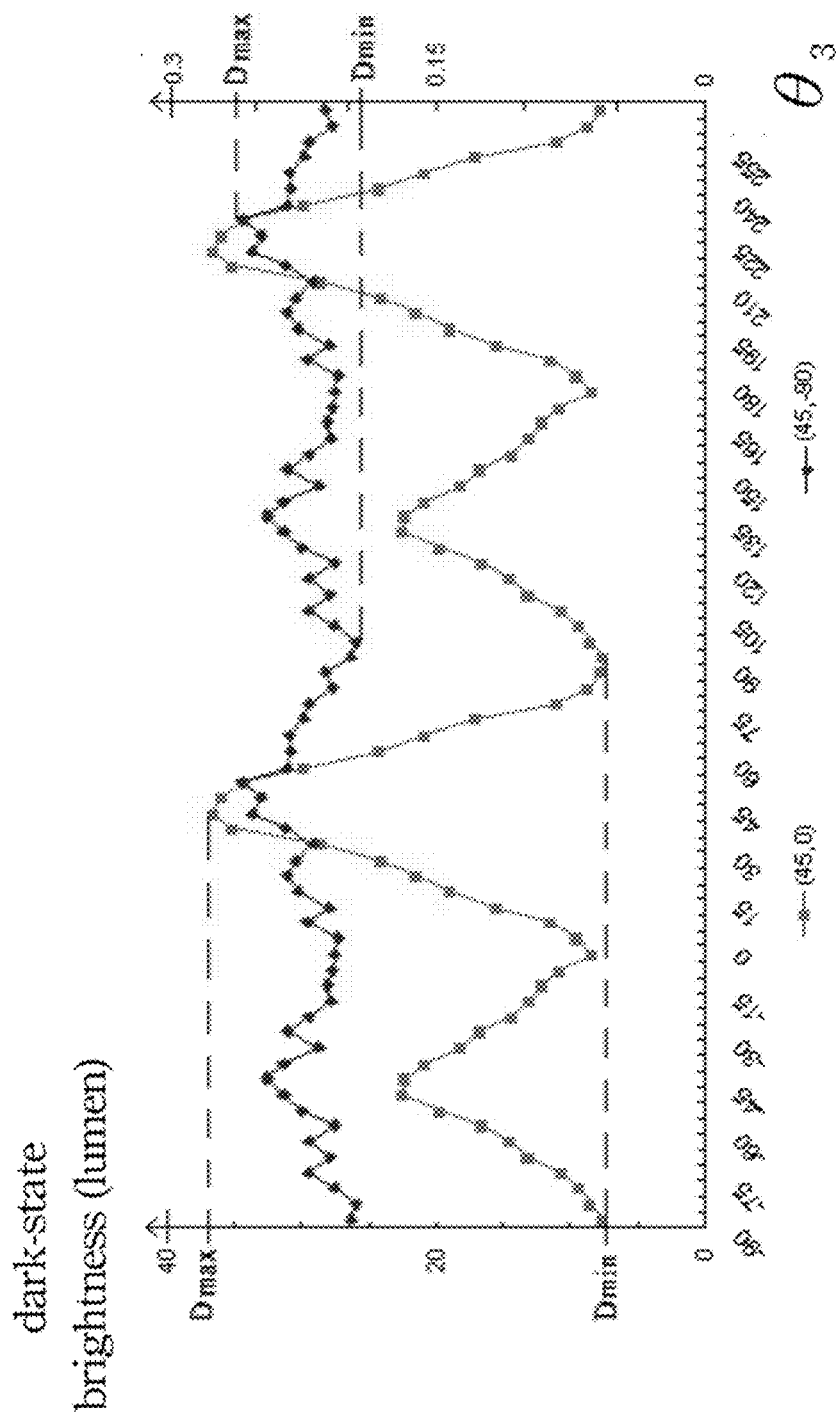
FIG. 8b illustrates a curve of dark-state brightness versus $\theta_3$ in accordance with the fourth embodiment of the present invention.

It is worthy to be noted that, when the diffractive direction of the diffraction plate 710 is changed, the aforementioned angle range which can enable the LCD 700 to have better dark-state performance is also changed. For example, referring to FIG. 8a, FIG. 8a is a schematic diagram showing the relationships among the light absorption axes 722 and 724 of the polarizers, the diffractive direction 712 of the diffraction plate 710 and the light-collecting direction 752 of the first brightness enhancement film 750, wherein the diffractive direction 712 of the diffraction plate 710 is 0 degree. When the diffractive direction 712 of the diffraction plate 710 becomes 0 degree, the dark-state brightness of the respective angles $\theta_3$ (equivalent to rotation angles of the BEF) of the LCD 700 are shown in FIG. 8b.

At first, the dark-state brightness observed at the zenithal angle of 45 degrees and the azimuthal angle of 0 degree is considered. From FIG. 8b, it can be known that if ¼ΔD is used as the dark-state standard, it found that the LCD 700 has better dark-state performance when $\theta_3$ is from 65 degrees to 125 degrees or from −40 degrees to 20 degrees. That is, under the condition that the light absorption axis of the polarizer is fixed, and when the included angle between the diffractive direction 712 and the light-collecting direction 752 of the first brightness enhancement film 750 is from 65 degrees to 125 degrees or from −40 degrees to 20 degrees, the LCD 700 has better dark-state performance. Further, if ¼ΔD is used as the dark-state standard, it can be found that, the LCD 700 has better dark-state performance when $\theta_3$ is from −25 degrees to 5 degrees, and meanwhile the angle between the diffractive direction 712 and the light-collecting direction 752 of the first brightness enhancement film 750 is from −25 degrees to 5 degrees. Further, if ⅛ΔD is used as the dark-state standard, it can be found that, the LCD 700 has better dark-state performance when 9 is from 75 degrees to 105 degrees, and meanwhile the included angle between the diffractive direction 712 and the light-collecting direction 752 of the first brightness enhancement film 750 is from 75 degrees to 105 degrees or from −10 degrees to 0 degree.

Then, the dark-state brightness observed at the zenithal angle of 45 degrees and the azimuthal angle of 270 degrees is considered. From FIG. 8b, it can be known that if ½ΔD is used as the dark-state standard, it is found that the LCD 700 has better dark-state performance when $\theta_3$ is from 70 degrees to 125 degrees. That is, under the condition that the light absorption axis of the polarizer is fixed, when the angle between the diffractive direction 712 and the light-collecting direction 752 of the first brightness enhancement film 750 is from 70 degrees to 125 degrees, the LCD 700 has better dark-state performance.

Further, in the embodiment in which the diffractive direction 712 is set in the direction of 0 degree, if the affect of the included angle between the light-collecting direction 752 and the light absorption axis 722 on the dark-state in light leakage is considered, since $\theta_3$ is the included angle between the light-collecting axis 752 and the light absorption axis 722, the LCD 700 has better dark-state performance when the angle between the light absorption axis 722 and the light-collecting direction 752 is from −40 degrees to 20 degrees or from 65 degrees to 125 degrees (with respect to an observer at the zenithal angle of 45 degrees and the azimuthal angle of 0 degree), or is from 70 degrees to 125 degrees (with respect to an observer at the zenithal angle of 45 degrees and the azimuthal angle of 270 degrees).

In another embodiment of the present invention, the diffraction plate 710 may have two diffractive directions (such as 0 degree and 45 degrees) for enabling the LCD to have better image quality uniformity for the viewing angles. Meanwhile, the angle between the light absorption axis 722 and the light-collecting direction 752 can be from −5 degrees to −40 degrees or from 70 degrees to 80 degrees to improve the dark-state performance of the LCD. Further, the distribution trend of the brightness at dark-state with the included angle of 45 degrees between the diffractive direction and the light absorption axis is similar to that with the included angle of −45 degrees therebetween, and the distribution trend of the brightness at dark-state with the included angle of 0 degree between the diffractive direction and the light absorption axis is similar to that with the angle of 90 degrees therebetween, and thus analogously, the angle along the first or second diffractive direction can be selected from one of 45/−45 degrees or from one of 0/90 degrees.

Fifth Embodiment

Figure 9:
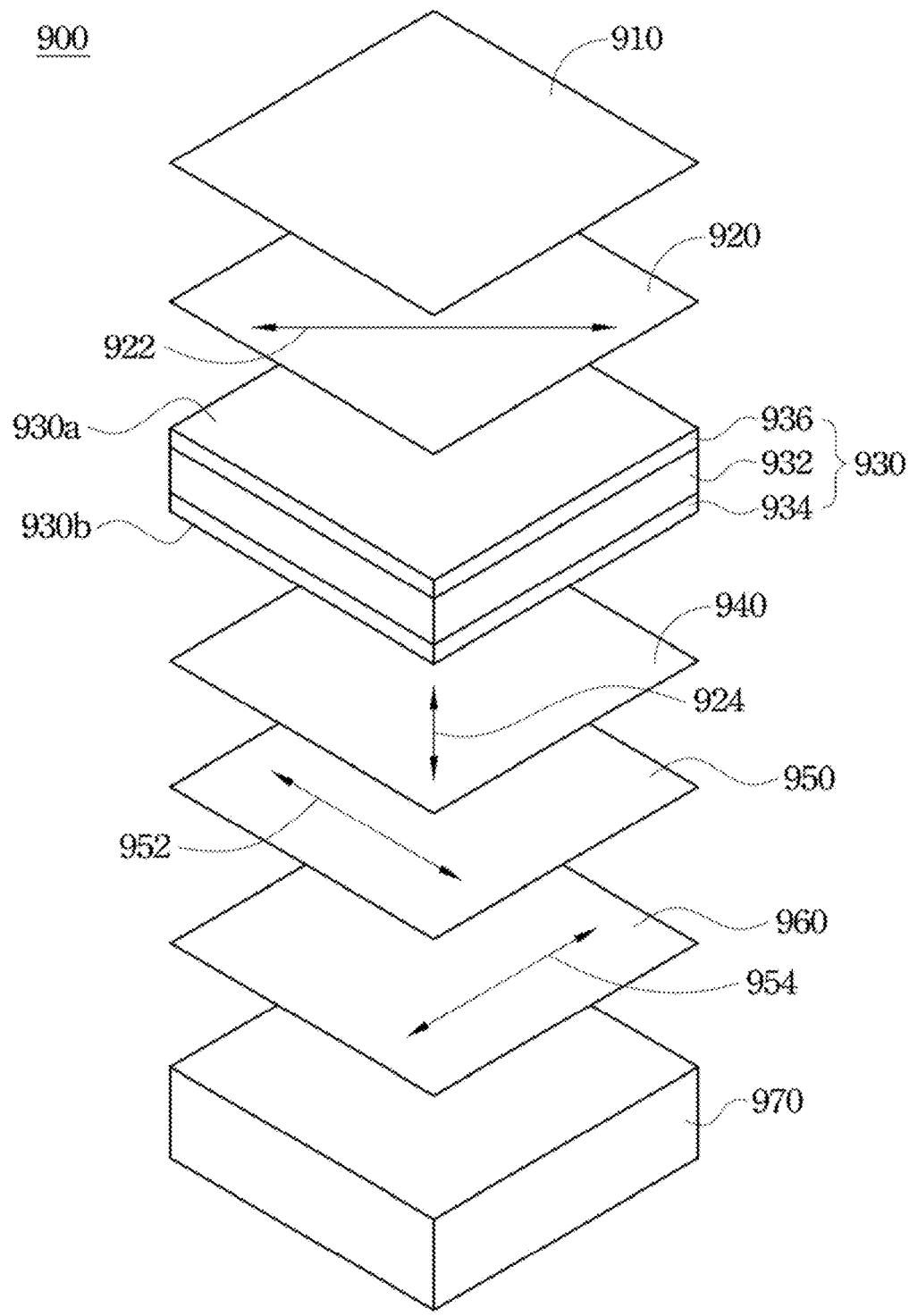
FIG. 9 is a schematic structure diagram of an LCD in accordance with a fifth embodiment of the present invention.

Referring to FIG. 9, FIG. 9 is a schematic structure diagram of an LCD 900 in accordance with another embodiment of the present invention. The LCD 900 is a TN LCD, and includes a diffraction plate 910, a first polarizer 920, an liquid crystal panel 930, a second polarizer 940, a first brightness enhancement film 950, a second brightness enhancement film 960 and a backlight module 970. In the present embodiment, the liquid crystal panel 930 is formed from a liquid crystal layer 932, a thin film transistor substrate 934 and a color filter 936, but embodiments of the present invention are not limited thereto.

The diffraction plate 910 and the first polarizer 920 are disposed above a surface 930a of the liquid crystal panel 930, and the first polarizer 920 is disposed between the diffraction plate 910 and the liquid crystal panel 930. The second polarizer 940, the first brightness enhancement film 950, the second brightness enhancement film 960 and the backlight module 970 are disposed below a surface 930b of the liquid crystal panel 930, wherein the surface 930a is opposite to the surface 930b. Further, as described in the first embodiment, the diffraction plate 910 also can be disposed between the first polarizer 920 and the liquid crystal panel 930.

The first polarizer 920 and the second polarizer 940 have respective light absorption axes 922 and 924 which are substantially perpendicular to each other. The first brightness enhancement film 950 and the second brightness enhancement film 960 have respective light-collecting directions 952 and 954 which are substantially perpendicular to each other.

Figure 9A:
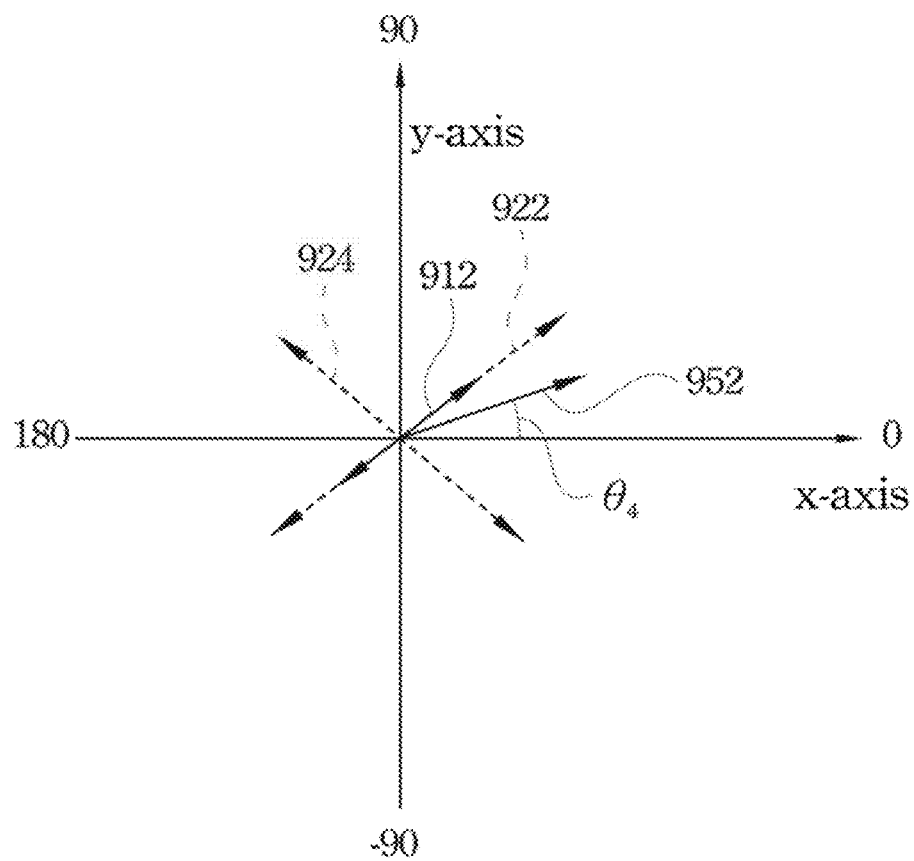
FIG. 9a is a schematic diagram showing the relationships among light absorption axes of polarizers, a diffractive direction of a diffraction plate, and a light-collecting direction of a first brightness enhancement film in accordance with the fifth embodiment of the present invention.

Referring to FIG. 9a, FIG. 9a is a schematic diagram showing the relationships among the light absorption axes 922 and 924 of the polarizers, the diffractive direction 912 of the diffraction plate 910, and the light-collecting direction 952 of the first brightness enhancement film 950, wherein the x-axis is a reference coordinate axis, and the light absorption axis 922 of the first polarizer 920 is in the direction of 45 degrees, and the light absorption axis 924 of the second polarizer 940 is in the direction of 135 degrees, and the diffractive direction 912 is in the direction of 45 degrees. In the present invention, an included angle $\theta_4$ is between the light-collecting axis 952 of the first brightness enhancement film 950 and the x-axis, wherein $\theta_4$ is a variable.

Figure 9B:
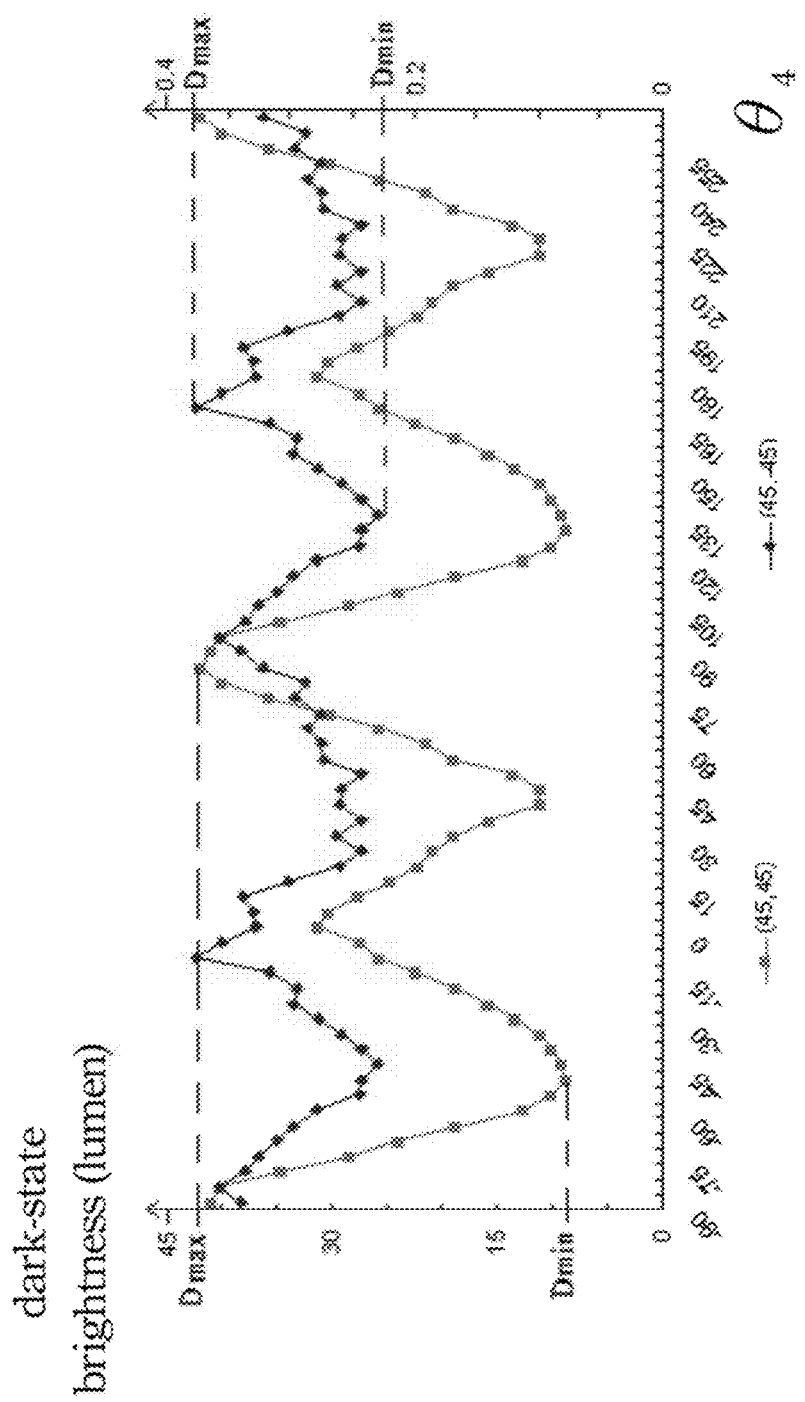
FIG. 9b illustrates a curve of dark-state brightness versus $\theta_4$ in accordance with the fifth embodiment of the present invention.

Referring to FIG. 9b, FIG. 9b illustrates a curve of dark-state brightness observed on the light absorption axis 922 of the first polarizer 920 versus angle $\theta_4$ (equivalent to a rotation angle of the brightness enhancement film (BEF)) for the LCD 900. That is, FIG. 9b shows the dark-state brightness observed at the zenithal angle of 45 degrees and the azimuthal angle of 45 degree, and the dark-state brightness observed at the zenithal angle of 45 degrees and the azimuthal angle of 315 degrees (−45 degrees). In the present embodiment, the dark-state leakage changes along the light absorption axis of the polarizer will be discussed.

At first, the dark-state brightness observed at the zenithal angle of 45 degrees and the azimuthal angle of 45 degrees is considered. From FIG. 9b, it can be known that if ½ΔD is used as the dark-state standard, it is found that the LCD 900 has better dark-state performance when $\theta_4$ is from −15 degrees to −70 degrees or from 15 degrees to 60 degrees, and meanwhile the angle between the diffractive direction 912 and the light-collecting direction 952 of the first brightness enhancement film 950 is from −60 degrees to −115 degrees or from −30 degrees to 15 degrees. Further, if ¼ΔD is used as the dark-state standard, it can be found that, the LCD 700 has better dark-state performance when $\theta_4$ is from −25 degrees to −60 degrees or from 35 degrees to 50 degrees, and meanwhile the angle between the diffractive direction 912 and the light-collecting direction 952 of the first brightness enhancement film 950 is from −70 degrees to −105 degrees or from −10 degrees to 5 degrees.

Then, the dark-state brightness observed at the zenithal angle of 45 degrees and the azimuthal angle of 315 degrees is considered. From FIG. 9b, it can be known that if ½ΔD is used as the dark-state standard, it is found that the LCD 900 has better dark-state performance when $\theta_4$ is from −20 degrees to −65 degrees or from 15 degrees to 80 degrees. That is, under the condition of the fixed light absorption axis of the polarizer, when the angle between the diffractive direction 912 and the light-collecting direction 952 of the first brightness enhancement film 950 is from −110 degrees to −65 degrees or from −30 degrees to 35 degrees, the LCD 900 has better dark-state performance. Further, if ⅛ΔD is used as the dark-state standard, it can be found that, the LCD 900 has better dark-state performance when $\theta_4$ is from −55 degrees to 40 degrees, and meanwhile the angle between the diffractive direction 912 and the light-collecting direction 952 of the first brightness enhancement film 950 is from −100 degrees to −85 degrees.

However, for human eyes, the use of ½ΔD as the dark-state standard is enough for the user not to sense apparent dark-state changes, and thus ½ΔD is used as the dark-state standard of the LCD of the present embodiment.

Further, in the present embodiment, if the affect of the angle between the light-collecting direction 952 and the light absorption axis 922 on the dark-state light leakage is considered, since $\theta_4$ is the angle included between the light-collecting axis 952 and the light absorption axis 922, the LCD 900 has better dark-state performance when the angle between the light absorption axis 922 and the light-collecting direction 952 is from −115 degrees to −60 degrees or from −30 degrees to 15 degrees (with respect to an observer at the zenithal angle of 45 degrees and the azimuthal angle of 45 degree), or is from −110 degrees to −65 degrees or from −30 degrees to 35 degrees (with respect to an observer at the zenithal angle of 45 degrees and the azimuthal angle of 315 degree).

Figure 10A:
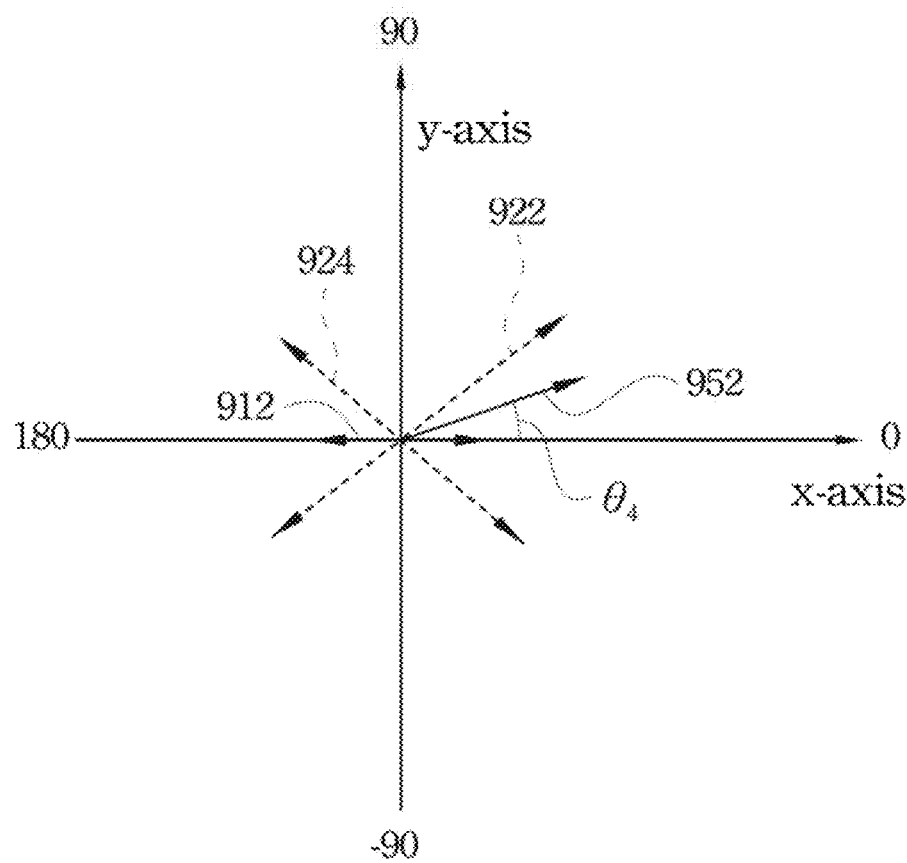
FIG. 10a is a schematic diagram showing the relationships among the light absorption axes of the polarizers, the diffractive direction of the diffraction plate, and the light-collecting direction of the first brightness enhancement film in accordance with the fifth embodiment of the present invention.
Figure 10B:
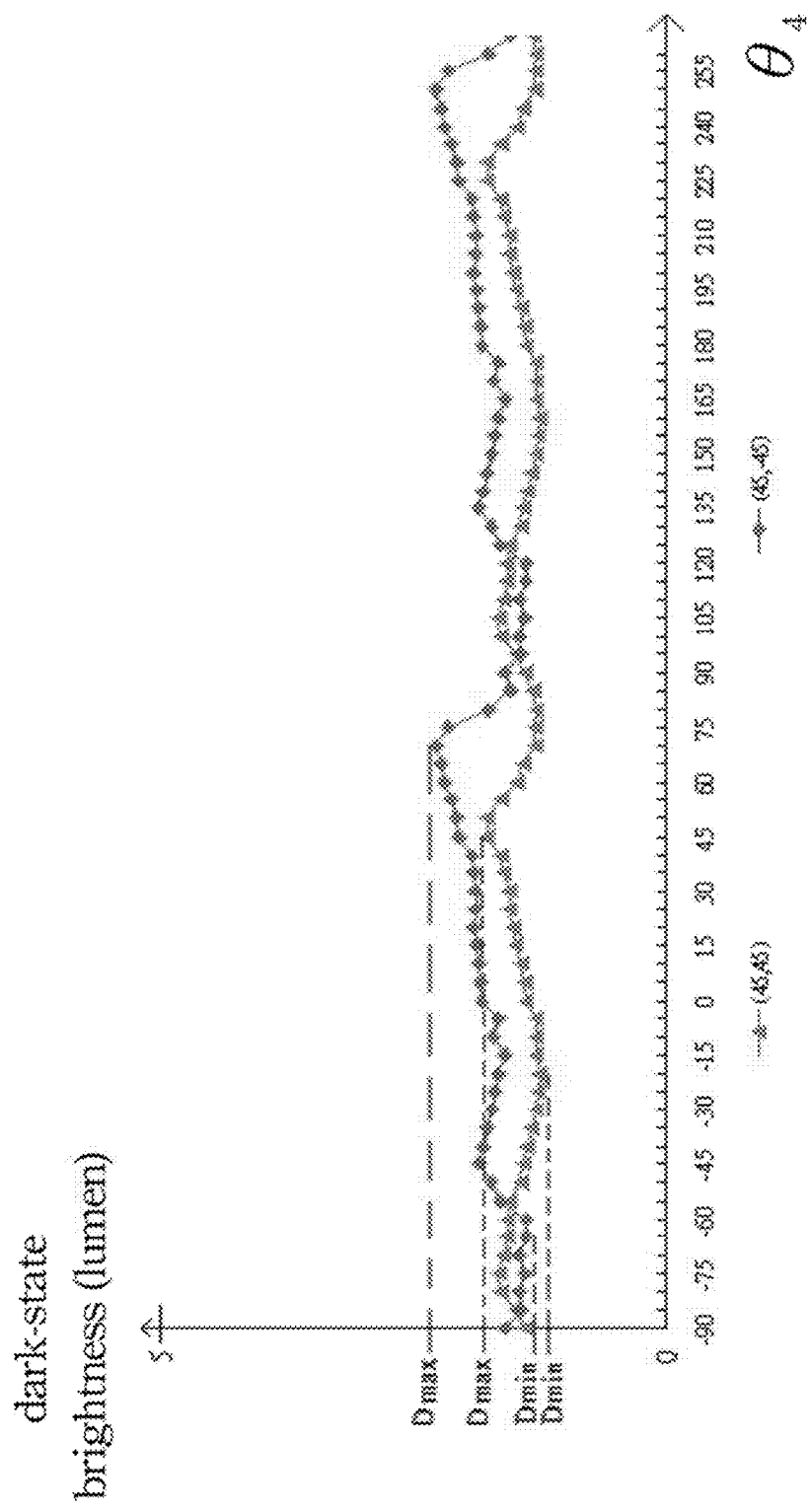
FIG. 10b illustrates a curve of dark-state brightness versus $\theta_4$ in accordance with the fifth embodiment of the present invention.

It is worthy to be noted that, when the diffractive direction of the diffraction plate 910 is changed, the aforementioned angle range which can enable the LCD 900 to have better dark-state performance is also changed. For example, referring to FIG. 10a, FIG. 10a is a schematic diagram showing the relationships among the light absorption axes 922 and 924 of the polarizers, the diffractive direction 912 of the diffraction plate 910 and the light-collecting direction 952 of the first brightness enhancement film 950, wherein the diffractive direction 912 of the diffraction plate 910 is 0 degree. When the diffractive direction 912 of the diffraction plate 910 becomes 0 degree, the dark-state brightness of the respective angles $\theta_4$ (equivalent to rotation angles of the BEF) of the LCD 900 are shown in FIG. 10b.

At first, the dark-state brightness observed at the zenithal angle of 45 degrees and the azimuthal angle of 45 degree is considered. From FIG. 10b, it can be known that if ½ΔD is used as the dark-state standard, it is found that the LCD 900 has better dark-state performance when $\theta_4$ is from 15 degrees to −50 degrees. That is, under the condition of the fixed light absorption axis of the polarizer, when the angle between the diffractive direction 912 and the light-collecting direction 952 of the first brightness enhancement film 950 is from 15 degrees to −50 degrees, the LCD 900 has better dark-state performance. Further, if ¼ΔD is used as the dark-state standard, it can be found that, the LCD 900 has better dark-state performance when $\theta_4$ is from 0 degree to −40 degrees, and meanwhile the angle between the diffractive direction 912 and the light-collecting direction 952 of the first brightness enhancement film 950 is from 0 degree to −40 degrees. Further, if ⅛ΔD is used as the dark-state standard, it can be found that, the LCD 900 has better dark-state performance when $\theta_4$ is from −5 degrees to −30 degrees, and meanwhile the angle between the diffractive direction 912 and the light-collecting direction 952 of the first brightness enhancement film 950 is from −5 degrees to −30 degrees.

Then, the dark-state brightness observed at the zenithal angle of 45 degrees and the azimuthal angle of 315 degrees is considered. From FIG. 10b, it can be known that if ¼ΔD is used as the dark-state standard, it is found that the LCD 900 has better dark-state performance when θ is from 80 degrees to 130 degrees. That is, under the condition of the fixed light absorption axis of the polarizer, when the angle between the diffractive direction 912 and the light-collecting direction 952 of the first brightness enhancement film 950 is from 80 degrees to 130 degrees, the LCD 900 has better dark-state performance.

Further, in the embodiment in which the diffractive direction 912 is along the direction of 0 degree, if the affect of the angle between the light-collecting direction 952 and the light absorption axis 922 on the dark-state light leakage is considered, since $\theta_4$ is the angle included between the light-collecting axis 952 and the light absorption axis 922, the LCD 900 has better dark-state performance when the angle between the light absorption axis 922 and the light-collecting direction 952 is from −95 degrees to −30 degrees or from 65 degrees to −125 degrees (with respect to an observer at the zenithal angle of 45 degrees and the azimuthal angle of 45 degrees), or is from 35 degrees to 85 degrees (with respect to an observer at the zenithal angle of 45 degrees and the azimuthal angle of 315 degrees).

In another embodiment of the present invention, the diffraction plate 910 may have two diffractive directions (such as 0 degree and 45 degrees) for enabling the LCD to have better image quality uniformity for the viewing angles. Meanwhile, the angle between the light absorption axis 922 and the light-collecting direction 952 can be from −95 degrees to −65 degrees to improve the dark-state performance of the LCD. Further, the distribution trend of the brightness at dark-state with the included angle of 45 degrees between the diffractive direction and the light absorption axis is similar to that with the included angle of −45 degrees therebetween, and the distribution trend of the brightness at dark-state with the included angle of 0 degree between the diffractive direction and the light absorption axis is similar to that with the included angle of 90 degrees therebetween, and thus analogously, the angle along the first or second diffractive direction can be selected from one of 45/−45 degrees or from one of 0/90 degrees.

It can be known from the above that, the fourth and fifth embodiments provide the designs of the angular relationship between the light-collecting direction of the brightness enhancement film and the light diffractive direction of the diffraction plate for improving the dark-state light leakage along the normal viewing angle with respect to VA and TN LCDs respectively. However, if the type of LCD is not limited (to VA or TN, or the diffractive direction of the diffraction plate (0 or 45 degrees)), the angle between the diffractive direction of the diffraction plate and the light-collecting direction of the brightness enhancement film can be an intersection of the aforementioned preferred angle ranges, i.e. from 115 degrees to 60 degrees and from −30 degrees to 15 degrees. For example, the diffractive direction of the diffraction plate can substantially perpendicular (about 90 degrees) or parallel (about 0 degree) to the light-collecting direction of the brightness enhancement film. Further, for the diffraction plate with two diffractive directions, such as the LCD in which respective angles of two diffractive directions relative to the light absorption axis of the first polarizer are 45/0 degrees, the angles included between the light absorption axis of the first polarizer and the light-collecting direction of the first brightness enhancement film can selected from one of the angle range from 40 degrees to −5 degrees; from 70 degrees to 80 degrees; or from −95 degrees to −65 degrees.

Sixth Embodiment

Figure 11:
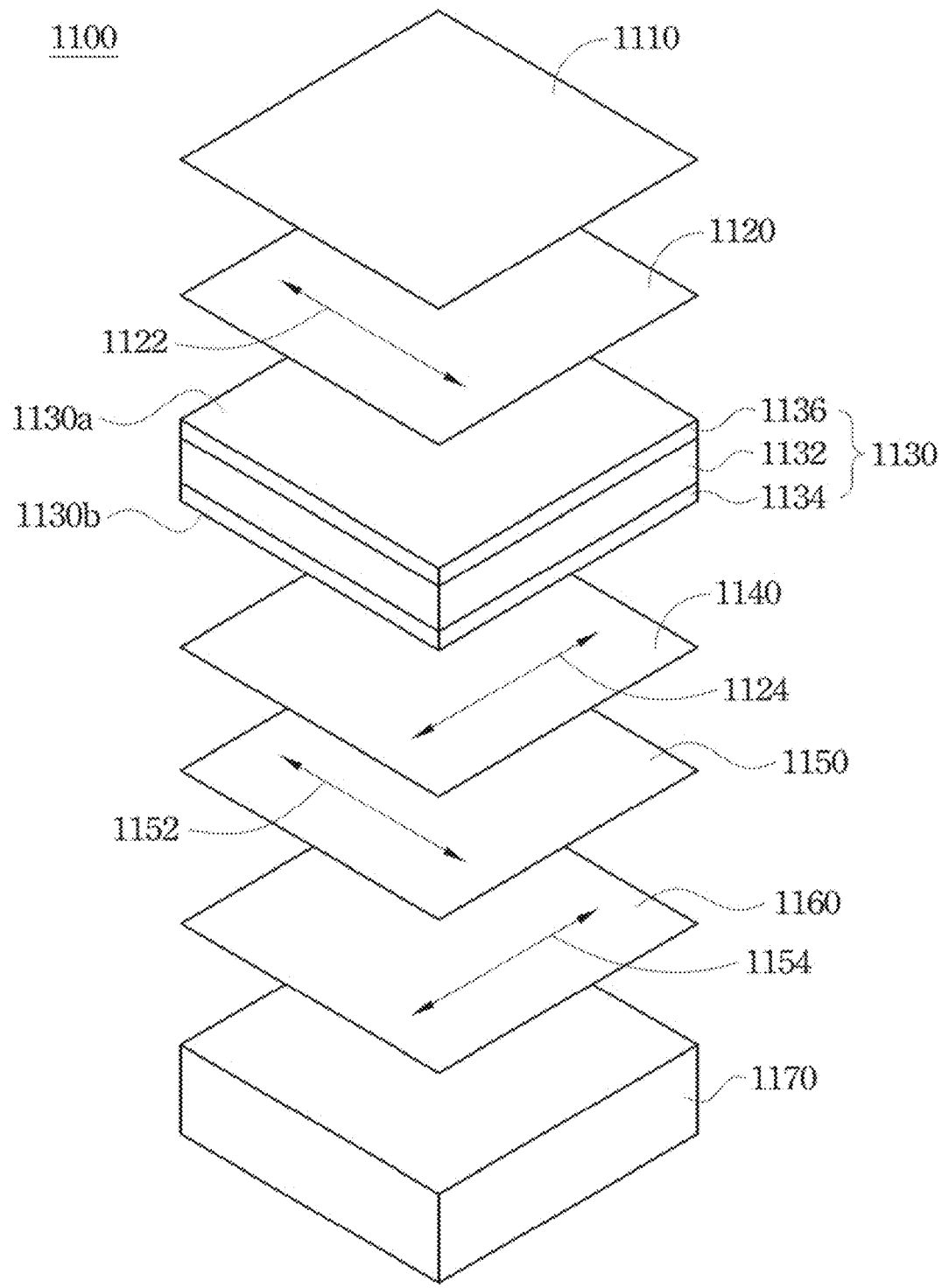
FIG. 11 is a schematic structure diagram of an LCD in accordance with a sixth embodiment of the present invention.

Referring to FIG. 11, FIG. 11 is a schematic structure diagram of an LCD 1100 in accordance with another embodiment of the present invention. The LCD 1100 is a VA LCD, and includes a diffraction plate 1110, a first polarizer 1120, an liquid crystal panel 1130, a second polarizer 1140, a first brightness enhancement film 1150, a second brightness enhancement film 1160 and a backlight module 1170. In the present embodiment, the liquid crystal panel 1130 is formed from a liquid crystal layer 1132, a thin film transistor substrate 1134 and a color filter 1136, but embodiments of the present invention are not limited thereto.

The diffraction plate 1110 and the first polarizer 1120 are disposed above a surface 1130a of the liquid crystal panel 1130, and the first polarizer 1120 is disposed between the diffraction plate 1110 and the liquid crystal panel 1130. The second polarizer 1140, the first brightness enhancement film 1150, the second brightness enhancement film 1160 and the backlight module 1170 are disposed below a surface 1130b of the liquid crystal panel 1130, wherein the surface 1130a is opposite to the surface 1130b. Further, as described in the first embodiment, the diffraction plate 1110 also can be disposed between the first polarizer 1120 and the liquid crystal panel 1130.

The first polarizer 1120 and the second polarizer 1140 have respective light absorption axes 1122 and 1124 which are substantially perpendicular to each other. The first brightness enhancement film 1150 and the second brightness enhancement film 1160 have respective light-collecting directions 1152 and 1154 which are substantially perpendicular to each other.

Figure 11A:
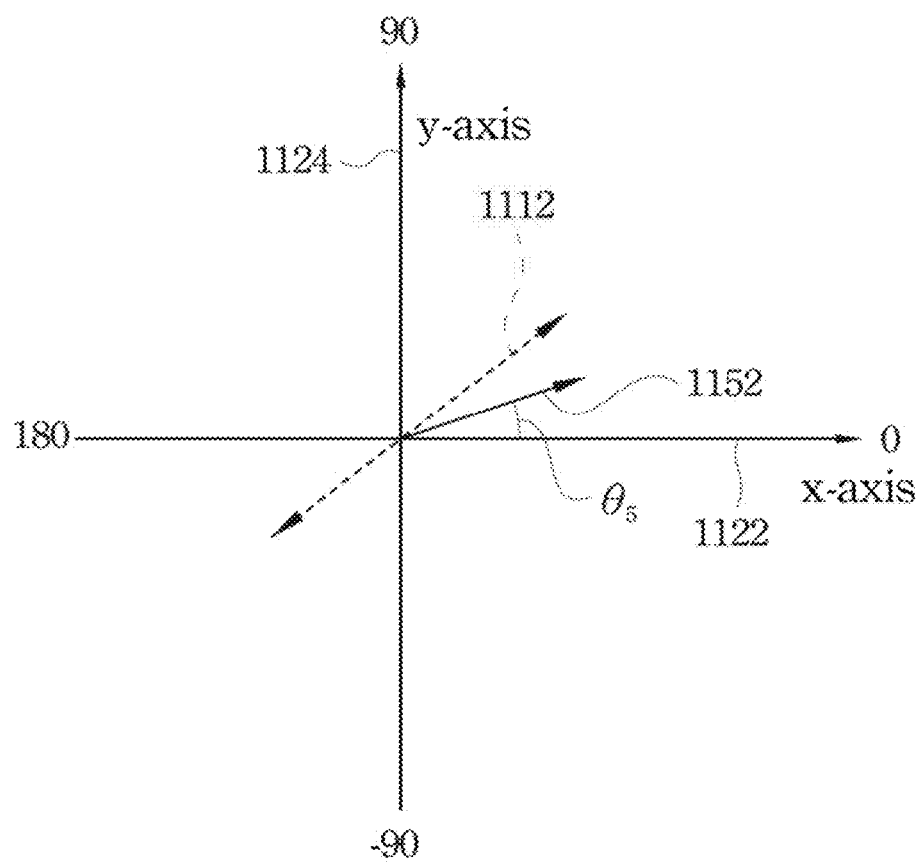
FIG. 11a is a schematic diagram showing the relationships among light absorption axes of polarizers, a diffractive direction of a diffraction plate, and a light-collecting direction of a first brightness enhancement film in accordance with the sixth embodiment of the present invention.

Referring to FIG. 11a, FIG. 11a is a schematic diagram showing the relationships among the light absorption axes 1122 and 1124 of the polarizers, the diffractive direction 1112 of the diffraction plate 1110, and the light-collecting direction 1152 of the first brightness enhancement film 1150, wherein the x-axis is a reference coordinate axis. For example, the light absorption axis 1122 of the first polarizer 1120 represents the directions of 0 degree and 180 degrees, and the light absorption axis 1124 of the second polarizer 1140 represents the directions of 90 degrees and −90 degrees. In the present invention, the diffractive direction 1112 is in the direction of 45 degrees, and an included angle $\theta_5$ is between the light-collecting axis 1152 of the first brightness enhancement film 1150 and the light absorption axis 1122 of the first polarizer 1120, wherein $\theta_5$ is a variable.

Figure 11B:
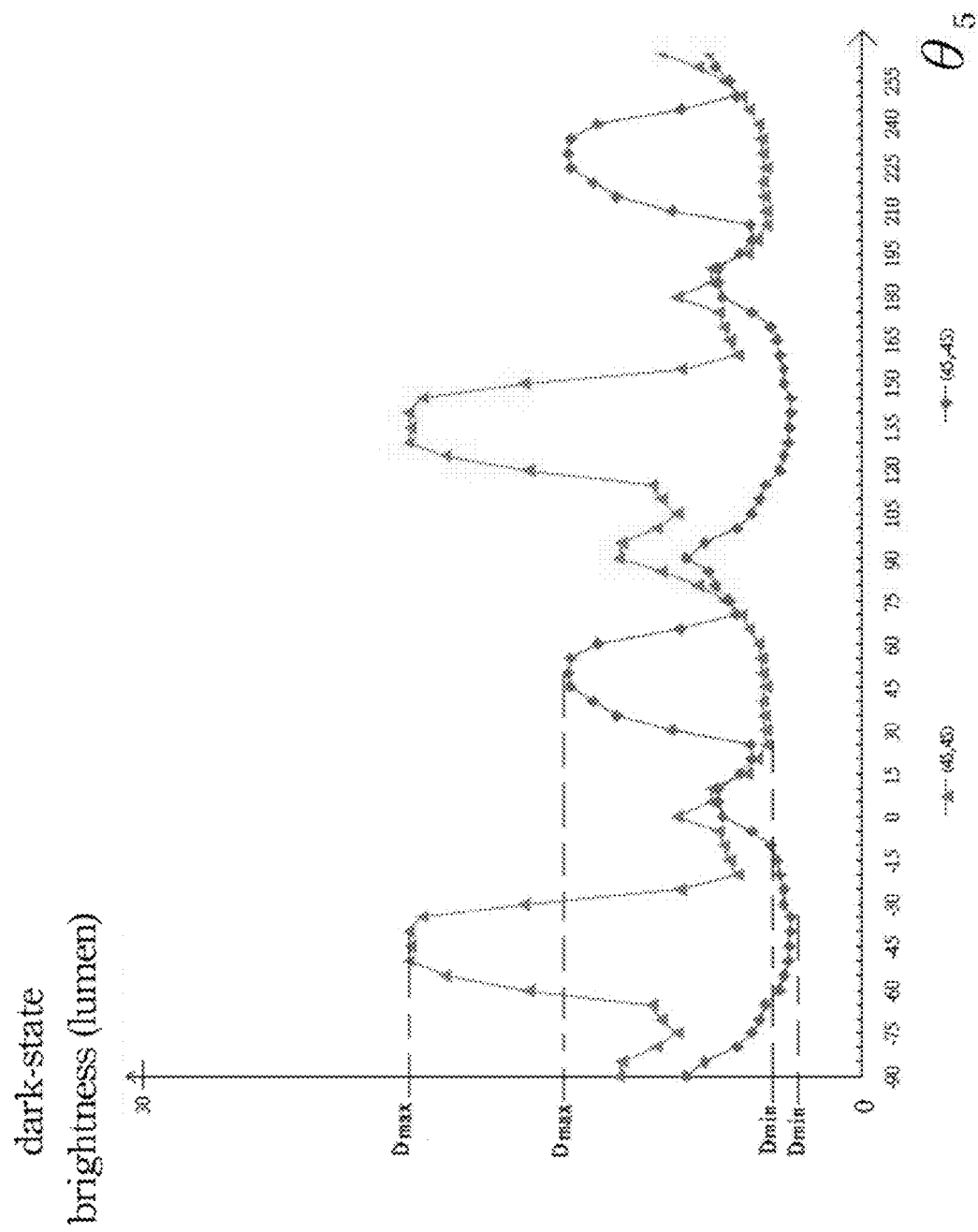
FIG. 11b illustrates a curve of dark-state brightness versus $\theta_5$ in accordance with the sixth embodiment of the present invention.

Referring to FIG. 11b, FIG. 11b illustrates a curve of the brightness at dark-state observed on the light absorption axis 1122 of ±45 degrees versus angle $\theta_5$ (equivalent to a rotation angle of the brightness enhancement film (BEF)) of the LCD 1100. That is, FIG. 11b shows the dark-state brightness observed at the zenithal angle of 45 degrees and the azimuthal angle of 45 degrees, and the dark-state brightness observed at the zenithal angle of 45 degrees and the azimuthal angle of 315 degrees. In the present embodiment, the dark-state leakage changes which are not along the light absorption axis of the polarizer will be discussed.

At first, the dark-state brightness observed at the zenithal angle of 45 degrees and the azimuthal angle of 45 degrees is considered. From FIG. 11b, it can be known that if ½ΔD is used as the dark-state standard, it is found that the LCD 1100 has better dark-state performance when $\theta_5$ is from −25 degrees to 115 degrees. That is, under the condition of the fixed light absorption axis of the polarizer, when the angle between the light-collecting direction 1152 and the light absorption axis 1122 is from −25 degrees to 115 degrees, the LCD 1100 has better dark-state performance. Further, if ¼ΔD is used as the dark-state standard, it can be found that, the LCD 1100 has better dark-state performance when $\theta_5$ is from 0 degree to 80 degrees, and meanwhile the angle between the light-collecting direction 1152 and the light absorption axis 1122 is from 0 degree to 80 degrees. Further, if ⅛ΔD is used as the dark-state standard, it can be found that, the LCD 1100 has better dark-state performance when $\theta_5$ is from 15 degrees to 75 degrees, and meanwhile the angle between the light-collecting direction 1152 and the light absorption axis 1122 is from 15 degrees to 75 degrees.

Then, the dark-state brightness observed at the zenithal angle of 45 degrees and the azimuthal angle of 315 degrees (−45 degrees) is considered. From FIG. 11b, it can be known that if ½ΔD is used as the dark-state standard, it is found that the LCD 1100 has better dark-state performance when $\theta_5$ is from 65 degrees to 205 degrees. That is, under the condition of the fixed light absorption axis of the polarizer, when the angle between the light-collecting direction 1152 and the light absorption axis 1122 is from 65 degrees to 205 degrees, the LCD 1100 has better dark-state performance. Further, if ¼ΔD is used as the dark-state standard, it is found that the LCD 1100 has better dark-state performance when $\theta_5$ is from 100 degrees to 175 degrees, and meanwhile the angle between the light-collecting direction 1152 and the light absorption axis 1122 is from 100 degrees to 175 degrees. Further, if ⅛ΔD is used as the dark-state standard, it is found that the LCD 1100 has better dark-state performance when $\theta_5$ is from 115 degrees to 170 degrees, and meanwhile the angle between the light-collecting direction 1152 and the light absorption axis 1122 is from 115 degrees to 170 degrees However, for human eyes, the use of ½ΔD as the dark-state standard is enough for the user not to sense apparent dark-state changes, and thus ½ΔD is used as the dark-state standard of the LCD of the present embodiment.

Further, for the LCD 1100, when the diffractive direction 1112 of the diffraction plate 1110 is in the direction of 45 degrees, if it is desired to simultaneously meet the requirements of the dark-state effect observed at the zenithal angle of 45 degrees and the azimuthal angle of 45 degrees and that observed at the zenithal angle of 45 degrees and the azimuthal angle of 315 degrees, the angle included between the light-collecting direction 1152 and the light absorption axis 1122 is designed to a range from −25 degrees to 25 degrees or from 65 degrees to 115 degrees. Such a design is to obtain the range from −25 degrees to 25 degrees or from 65 degrees to 115 degrees from an intersection of a range from −115 degrees to 25 degrees and that from −25 degrees to 115 degrees, since the brightness change from 65 degrees to 205 degrees is the same as that from −115 degrees to 25 degrees (the brightness curve at the right of 180 degrees used as the boundary is identical to that at the left thereof).

Figure 12A:
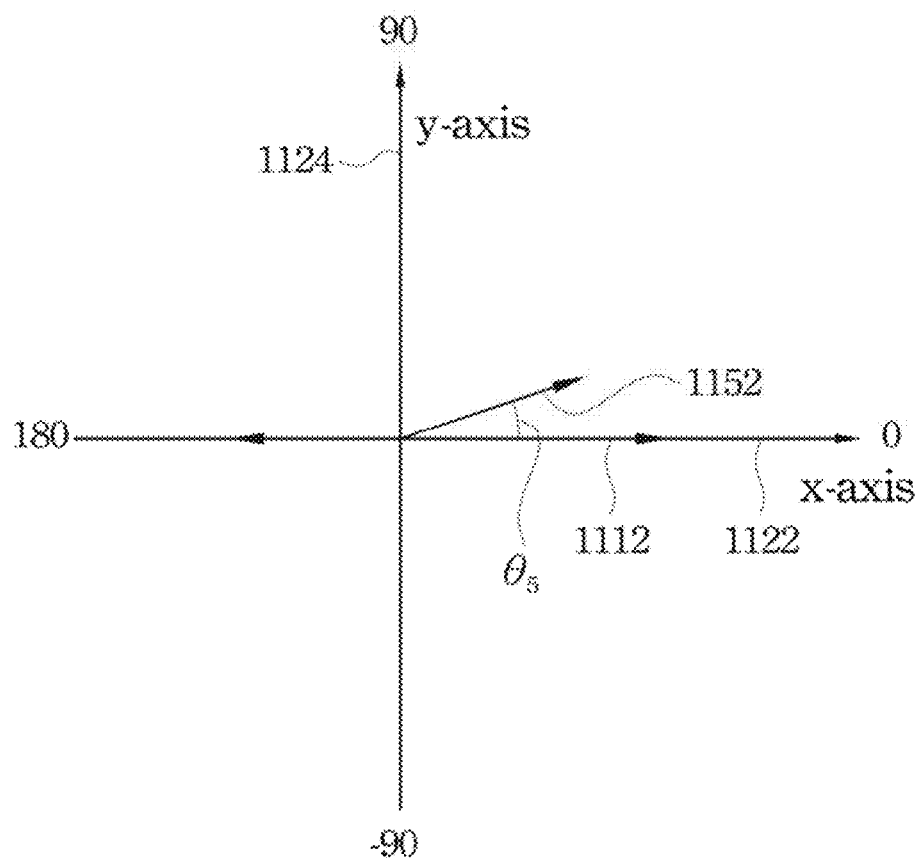
FIG. 12a is a schematic diagram showing the relationships among the light absorption axes of the polarizers, the diffractive direction of the diffraction plate, and the light-collecting direction of the first brightness enhancement film in accordance with the sixth embodiment of the present invention.
Figure 12B:
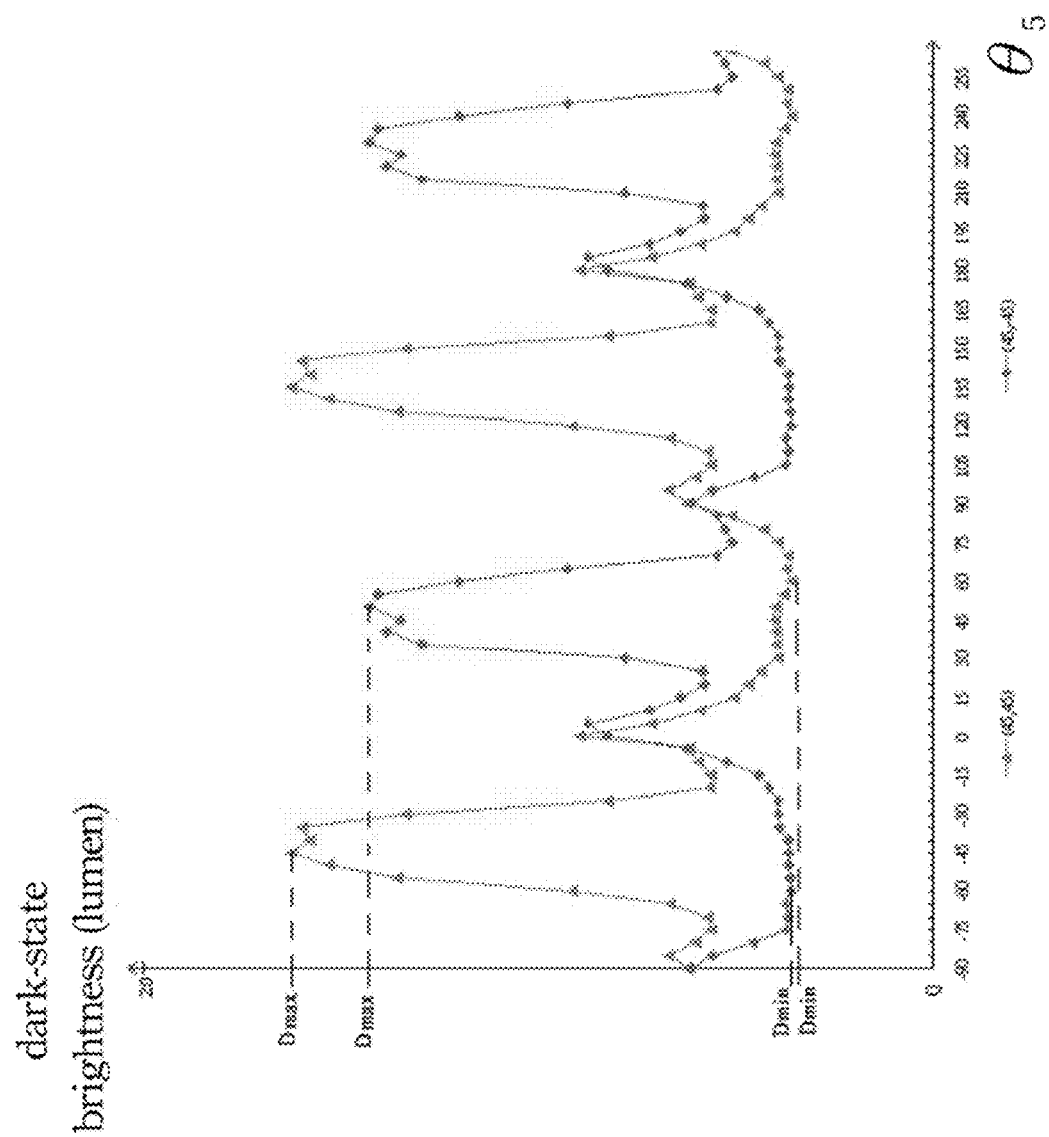
FIG. 12b illustrates a curve of dark-state brightness versus $\theta_5$ in accordance with the sixth embodiment of the present invention.

It is worthy to be noted that, when the diffractive direction of the diffraction plate 1110 is changed, the aforementioned angle range which can enable the LCD 1100 to have better dark-state performance is also changed. For example, referring to FIG. 12a, FIG. 12a is a schematic diagram showing the relationships among the light absorption axes 1122 and 1124 of the polarizers, the diffractive direction 1112 of the diffraction plate 1110 and the light-collecting direction 1152 of the first brightness enhancement film 1150, wherein the diffractive direction 1112 of the diffraction plate 1110 is 0 degree. When the diffractive direction 1112 of the diffraction plate 1110 becomes 0 degree, the dark-state brightness of the respective angles $\theta_5$ (equivalent to rotation angles of the BEF) of the LCD 1100 are shown in FIG. 12b.

At first, the brightness at dark-state observed at the zenithal angle of 45 degrees and the azimuthal angle of 45 degrees is considered. From FIG. 12b, it can be known that if ½ΔD is used as the dark-state standard, it is found that the LCD 1100 has better dark-state performance when $\theta_5$ is from −25 degrees to 120 degrees. That is, under the condition that the light absorption axis of the polarizer is fixed, and when the angle between the light-collecting direction 1152 and the light absorption axis 1122 is from −25 degrees to 120 degrees, the LCD 1100 has better dark-state performance. Further, if ¼ΔD is used as the dark-state standard, it can be found that, the LCD 1100 has better dark-state performance when $\theta_6$ is from 10 degrees to 115 degrees, and meanwhile the angle between the light-collecting direction 1152 and the light absorption axis 1122 is from 10 degrees to 115 degrees. Further, if ⅛ΔD is used as the dark-state standard, it can be found that, the LCD 1100 has better dark-state performance when θ$_5$ is from 15 degrees to 85 degrees, and meanwhile the angle between the light-collecting direction 1152 and the light absorption axis 1122 is from 15 degrees to 85 degrees.

Then, the brightness at dark-state observed at the zenithal angle of 45 degrees and the azimuthal angle of 315 degrees (−45 degrees) is considered. From FIG. 12b, it can be known that if ½ΔD is used as the dark-state standard, it is found that the LCD 1100 has better dark-state performance when θ$_5$ is from 70 degrees to 210 degrees. That is, under the condition of the fixed light absorption axis of the polarizer, when the angle between the light-collecting direction 1152 and the light absorption axis 1122 is from 70 degrees to 210 degrees, the LCD 1100 has better dark-state performance. Further, if ¼ΔD is used as the dark-state standard, it is found that the LCD 1100 has better dark-state performance when θ$_5$ is from 70 degrees to 175 degrees, and meanwhile the angle between the light-collecting direction 1152 and the light absorption axis 1122 is from 70 degrees to 175 degrees, the LCD 1100 has better dark-state performance. Further, if ⅛ΔD is used as the dark-state standard, it is found that the LCD 1100 has better dark-state performance when θ$_5$ is from 100 degrees to 165 degrees, and meanwhile the angle between the light-collecting direction 1152 and the light absorption axis 1122 is from 100 degrees to 165 degrees, the LCD 1100 has better dark-state performance.

Further, in the embodiment in which the diffractive direction 1112 of the diffraction plate 1110 is along the direction of 0 degree, it is desired to simultaneously meet the requirements of the dark-state effect observed at the zenithal angle of 45 degrees and the azimuthal angle of 45 degrees and that observed at the zenithal angle of 45 degrees and the azimuthal angle of 315 degrees, the included angle between the light-collecting direction 1152 and the light absorption axis 1122 is designed to a range from −25 degrees to 20 degrees or from 70 degrees to 120 degrees. Further, the brightness distribution trend at dark-state with the included angle of 45 degrees between the diffractive direction and the light absorption axis is similar to that of the included angle of −45 degrees therebetween, and the brightness distribution trend at dark-state with the included angle of 0 degree between the diffractive direction and the light absorption axis is similar to that of the angle of 90 degrees therebetween, and thus analogously, the angle along the first or second diffractive direction can be selected from one of 45/−45 degrees or from one of 0/90 degrees.

Summing up the description of the present embodiment, for the LCD 1100, if it is desired to satisfy the requirements of observers at various viewing angles, the angle included between the light-collecting direction 1152 of the brightness enhancement film of the LCD 1100 and the light absorption axis 1122 of the polarizer is from −25 degrees to 20 degrees or from TO degrees to 115 degrees.

Seventh Embodiment

Figure 13:
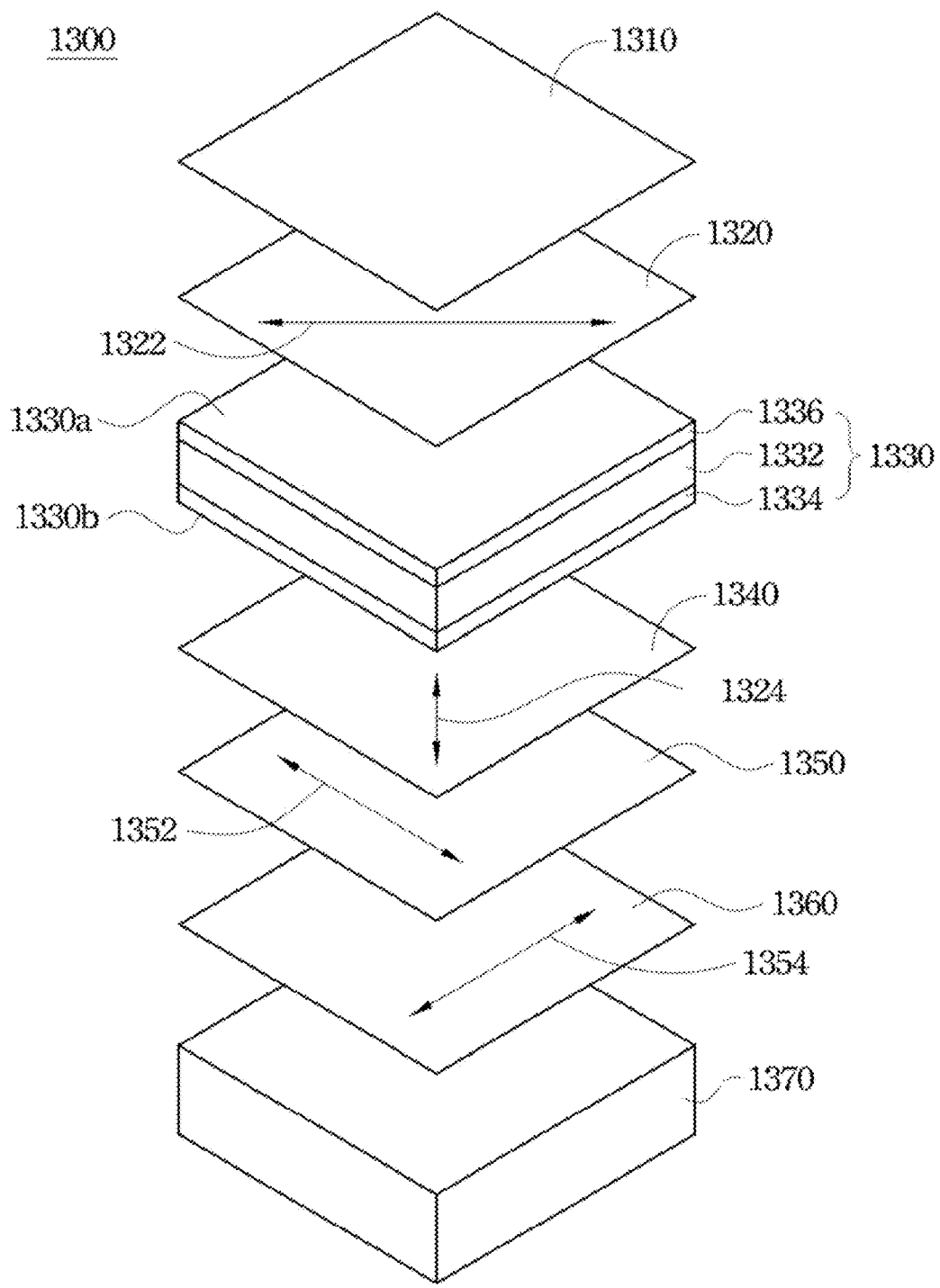
FIG. 13 is a schematic structure diagram of an LCD in accordance with a seventh embodiment of the present invention.

Referring to FIG. 13, FIG. 13 is a schematic structure diagram of an LCD 1300 in accordance with another embodiment of the present invention. The LCD 1300 is a TN LCD, and includes a diffraction plate 1310, a first polarizer 1320, an liquid crystal panel 1330, a second polarizer 1340, a first brightness enhancement film 1350, a second brightness enhancement film 1360 and a backlight module 1370. In the present embodiment, the liquid crystal panel 1330 is formed from a liquid crystal layer 1332, a thin film transistor substrate 1334 and a color filter 1336, but embodiments of the present invention are not limited thereto.

The diffraction plate 1310 and the first polarizer 1320 are disposed above a surface 1330a of the liquid crystal panel 1330, and the first polarizer 1320 is disposed between the diffraction plate 1310 and the liquid crystal panel 1330. The second polarizer 1340, the first brightness enhancement film 1350, the second brightness enhancement film 1360 and the backlight module 1370 are disposed below a surface 1330b of the liquid crystal panel 1330, wherein the surface 1330a is opposite to the surface 1330b Further, as described in the first embodiment, the diffraction plate 1310 also can be disposed between the first polarizer 1320 and the Liquid crystal panel 1330.

The first polarizer 1320 and the second polarizer 1340 have respective light absorption axes 1322 and 1324 which are substantially perpendicular to each other. The first brightness enhancement film 1350 and the second brightness enhancement film 1360 have respective light-collecting directions 1352 and 1354 which are substantially perpendicular to each other.

Figure 13A:
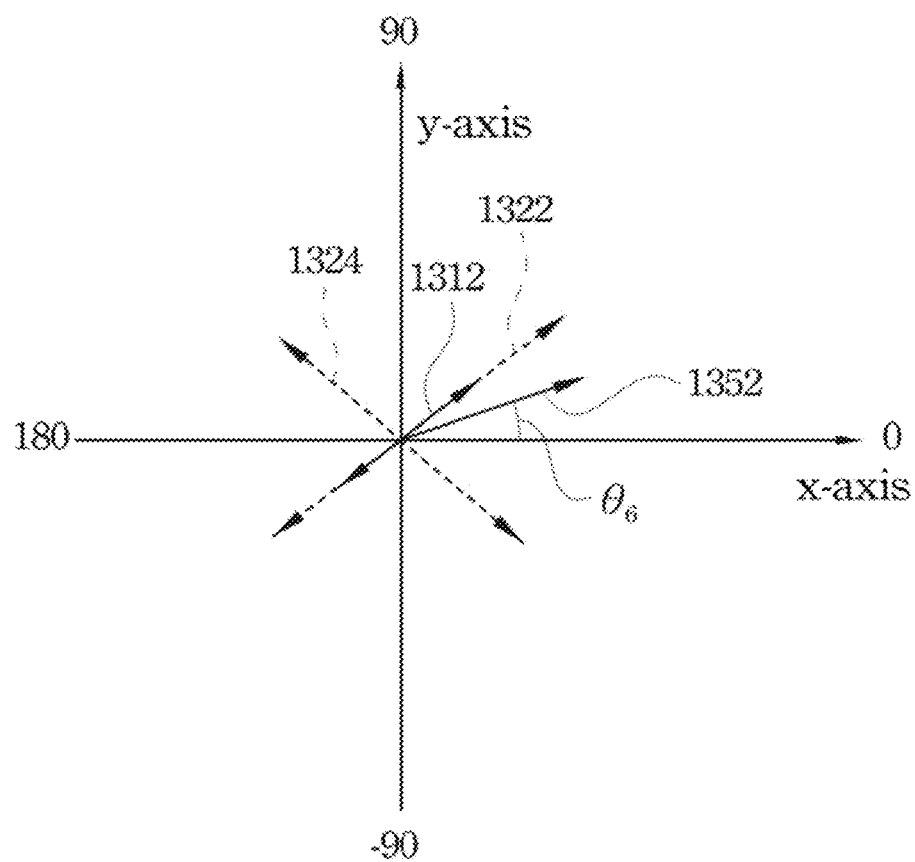
FIG. 13a is a schematic diagram showing the relationships among light absorption axes of polarizers, a diffractive direction of a diffraction plate, and a light-collecting direction of a first brightness enhancement film in accordance with the seventh embodiment of the present invention.

Referring to FIG. 13a, FIG. 13a is a schematic diagram showing the relationships among the light absorption axes 1322 and 1324 of the polarizers, the diffractive direction 1312 of the diffraction plate 1310, and the light-collecting direction 1352 of the first brightness enhancement film 1350, wherein the x-axis is a reference coordinate axis, and the light absorption axis 1322 of the first polarizer 1320 is in the direction of 45 degrees, and the light absorption axis 1324 of the second polarizer 1340 is in the direction of 135 degrees, and the diffractive direction 1312 is in the direction of 45 degrees. In the present invention, an included angle θ$_6$ is between the light-collecting axis 1352 of the first brightness enhancement film 1350 and the x-axis, wherein θ$_6$ is a variable.

Figure 13B:
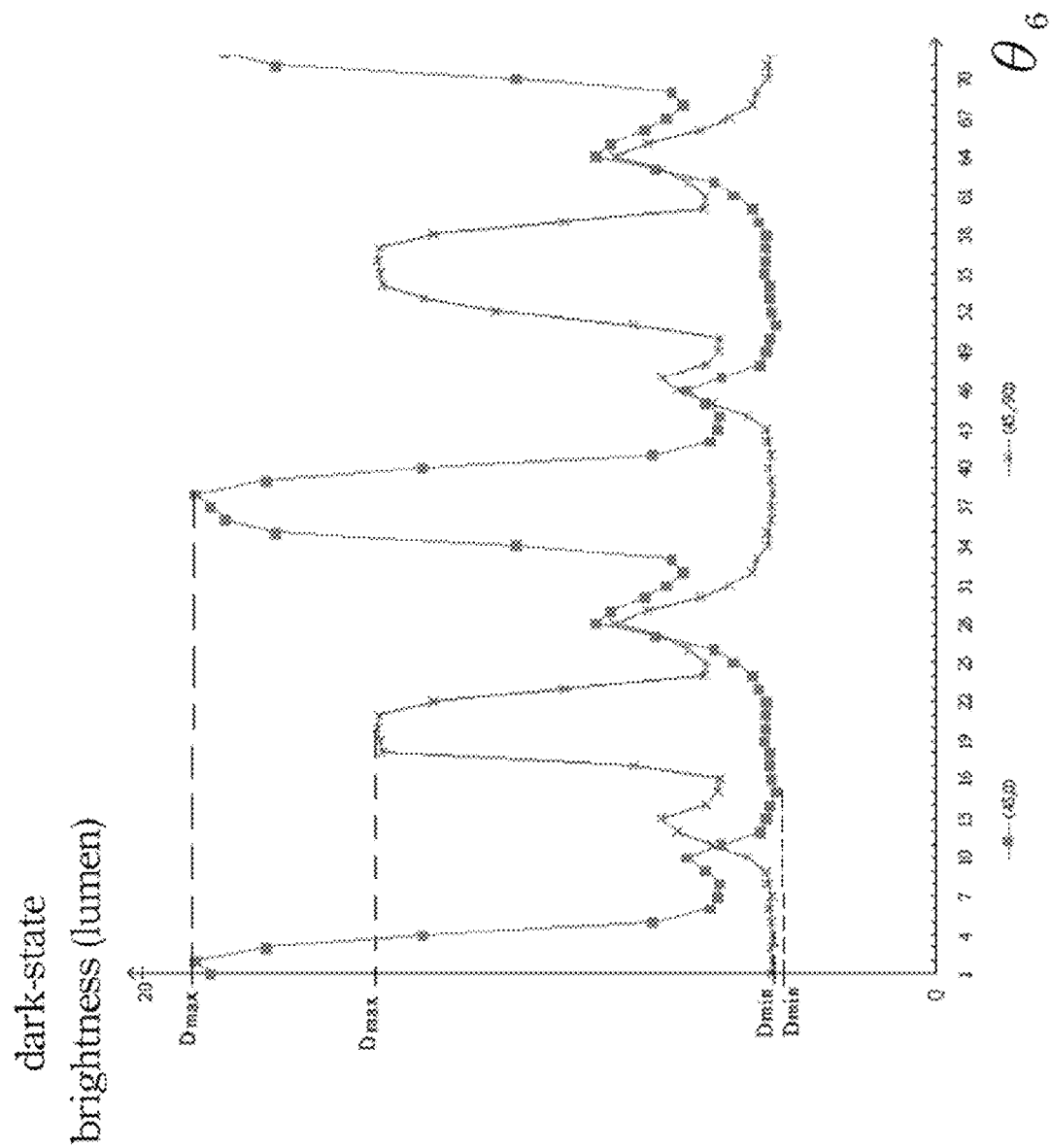
FIG. 13b illustrates a curve of dark-state brightness versus $\theta_6$ in accordance with the seventh embodiment of the present invention.

Referring to FIG. 13b, FIG. 13b illustrates a curve of brightness at dark-state observed on the light absorption axis 1322 of ±45 degrees versus angle θ$_6$ (equivalent to a rotation angle of the brightness enhancement film (BEF)) of the LCD 1300. That is, FIG. 13b shows the dark-state brightness observed at the zenithal angle of 45 degrees and the azimuthal angle of 0 degree, and the dark-state brightness observed at the zenithal angle of 45 degrees and the azimuthal angle of 270 degrees. In the present embodiment, the dark-state leakage changes which are not along the light absorption axis of the polarizer will be discussed.

At first, the dark-state brightness observed at the zenithal angle of 45 degrees and the azimuthal angle of 0 degree is considered. From FIG. 13b, it can be known that if ½ΔD is used as the dark-state standard, it is found that the LCD 1300 has better dark-state performance when θ$_6$ is from −70 degrees to 75 degrees. That is, under the condition that the light absorption axis of the polarizer is fixed, and when the angle between the light-collecting direction 1352 and the light absorption axis 1322 is from −115 degrees to 30 degrees, the LCD 1300 has better dark-state performance. Further, if ¼ΔD is used as the dark-state standard, it can be found that, the LCD 1300 has better dark-state performance when θ$_6$ is from 40 degrees to −70 degrees, and meanwhile the angle between the light-collecting direction 1352 and the light absorption axis 1322 is from −5 degrees to −115 degrees. Further, if ⅛ΔD is used as the dark-state standard, it can be found that, the LCD 1300 has better dark-state performance when θ$_6$ is from 35 degrees to −40 degrees, and meanwhile the angle between the light-collecting direction 1352 and the light absorption axis 1322 is from −10 degrees to −85 degrees.

Then, the dark-state brightness observed at the zenithal angle of 45 degrees and the azimuthal angle of 270 degrees (−90 degrees) is considered. From FIG. 13b, it can be known that if ½ΔD is used as the dark-state standard, it is found that the LCD 1300 has better dark-state performance when from 25 degrees to 160 degrees. That is, under the condition that the light absorption axis of the polarizer is fixed, and when the angle between the light-collecting direction 1352 and the light absorption axis 1322 is from −20 degrees to 115 degrees, the LCD 1300 has better dark-state performance. Further, if ¼ΔD is used as the dark-state standard, it is found that the LCD 1300 has better dark-state performance when $\theta_6$ is from 55 degrees to 135 degrees, and meanwhile the angle between the light-collecting direction 1352 and the light absorption axis 1322 is from 10 degrees to 90 degrees. Further, if ⅛ΔD is used as the dark-state standard, it is found that the LCD 1300 has better dark-state performance when $\theta_6$ is from 60 degrees to 125 degrees, and meanwhile the angle between the light-collecting direction 1352 and the light absorption axis 1322 is from 15 degrees to 80 degrees However, for human eyes, the use of ½ΔD as the dark-state standard is enough for the user not to sense apparent dark-state changes, and thus ½ΔD is used as the dark-state standard of the LCD of the present embodiment.

Further, for the LCD 1300, when the diffractive direction 1312 of the diffraction plate 1310 is in the direction of 45 degrees, if it is desired to simultaneously meet the requirements of the dark-state effect observed at the zenithal angle of 45 degrees and the azimuthal angle of 0 degree and that observed at the zenithal angle of 45 degrees and the azimuthal angle of 270 degrees, the angle included between the light-collecting direction 1352 and the light absorption axis 1322 is designed to a range from −115 degrees to −25 degrees or from −20 degrees to 15 degrees.

Figure 14A:
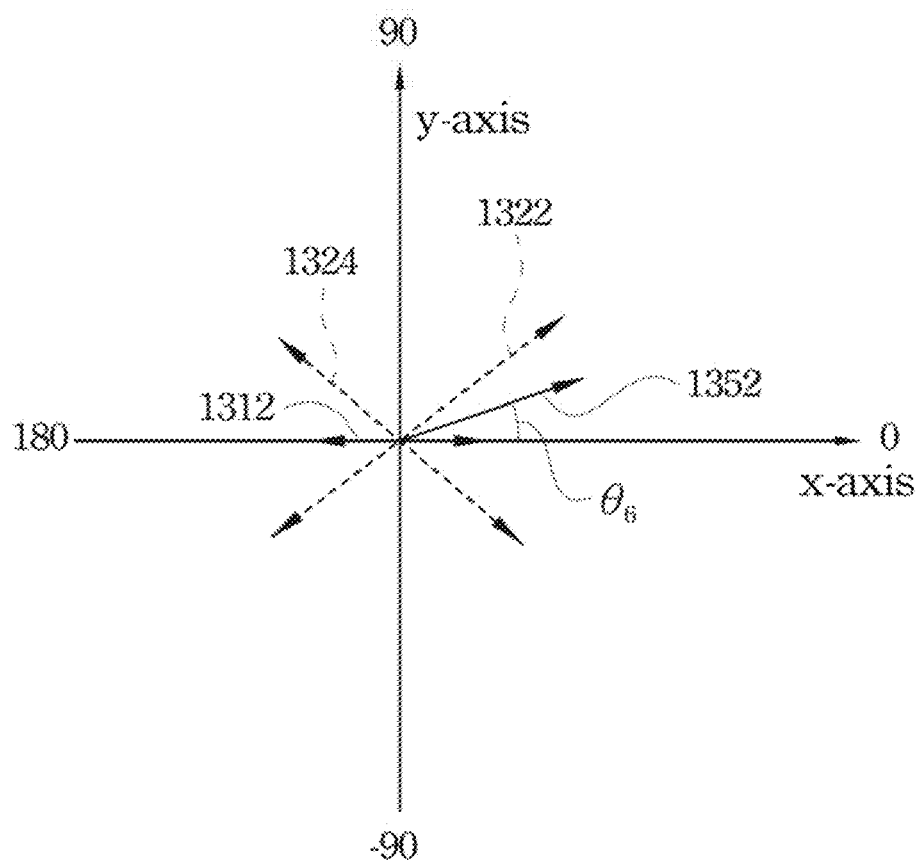
FIG. 14a is a schematic diagram showing the relationships among the light absorption axes of the polarizers, the diffractive direction of the diffraction plate, and the light-collecting direction of the first brightness enhancement film in accordance with the seventh embodiment of the present invention.
Figure 14B:
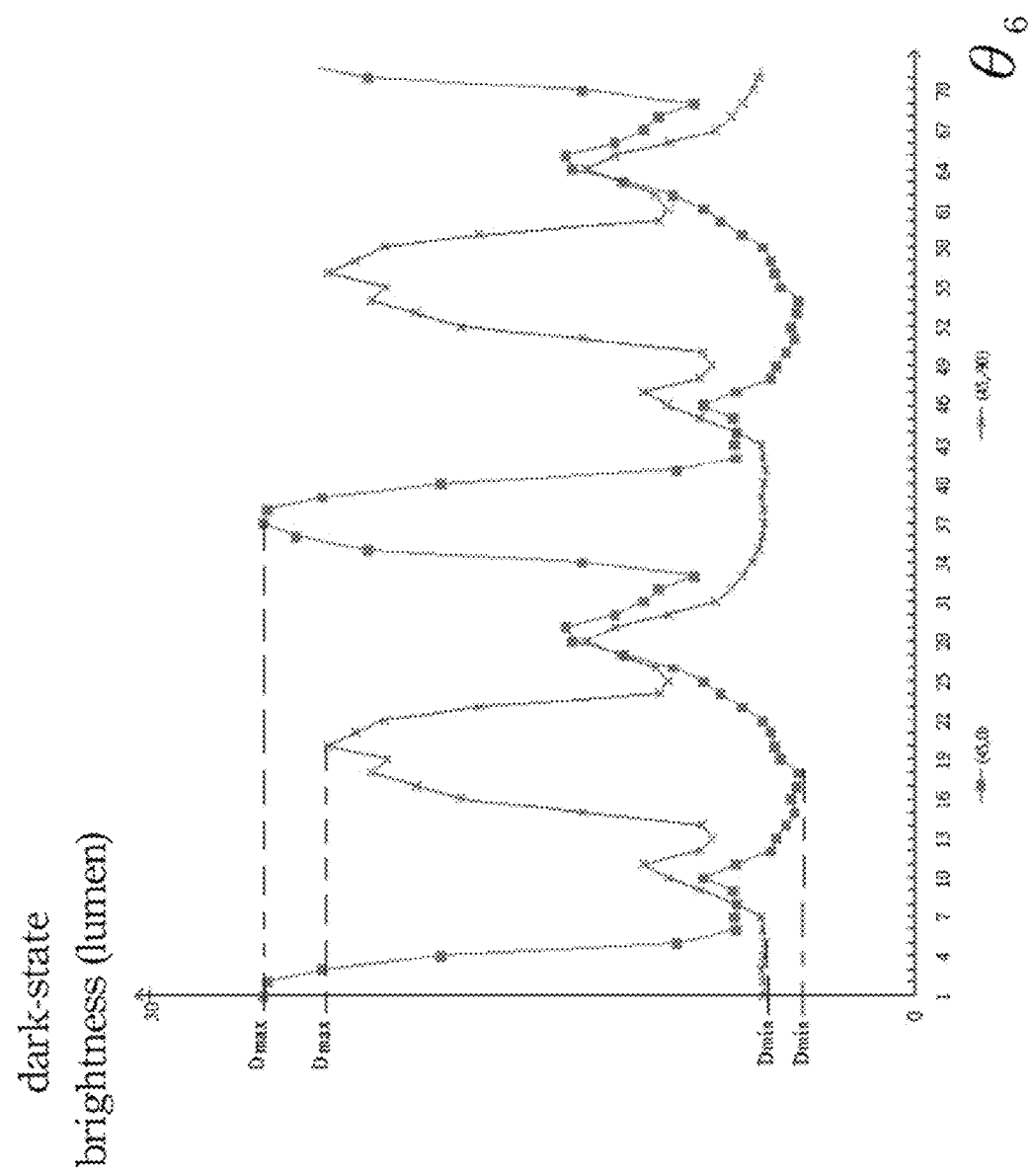
FIG. 14b illustrates a curve of dark-state brightness versus $\theta_6$ in accordance with the seventh embodiment of the present invention.

It is worthy to be noted that, when the diffractive direction of the diffraction plate 1310 is changed, the aforementioned angle range which can enable the LCD 1300 to have better dark-state performance is also changed. For example, referring to FIG. 14a, FIG. 14a is a schematic diagram showing the relationships among the light absorption axes 1322 and 1324 of the polarizers, the diffractive direction 1312 of the diffraction plate 1310 and the light-collecting direction 1352 of the first brightness enhancement film 1350, wherein the diffractive direction 1312 of the diffraction plate 1310 is 0 degree. When the diffractive direction 1312 of the diffraction plate 1310 becomes 0 degree, the dark-state brightness of the respective angles $\theta_6$ (equivalent to rotation angles of the BEF) of the LCD 1300 are shown in FIG. 14b.

At first, the dark-state brightness observed at the zenithal angle of 45 degrees and the azimuthal angle of 0 degree is considered. From FIG. 14b, it can be known that if ½ΔD is used as the dark-state standard, it is found that the LCD 1300 has better dark-state performance when $\theta_6$ is from −70 degrees to 75 degrees. That is, under the condition that the light absorption axis of the polarizer is fixed, and when the angle between the light-collecting direction 1352 and the light absorption axis 1322 is from −115 degrees to 30 degrees, the LCD 1300 has better dark-state performance. Further, if ¼ΔD is used as the dark-state standard, it can be found that, the LCD 1300 has better dark-state performance when $\theta_6$ is from −70 degrees to 35 degrees, and meanwhile the angle between the light-collecting direction 1352 and the light absorption axis 1322 is from −115 degrees to −10 degrees. Further, if ⅛ΔD is used as the dark-state standard, it can be found that, the LCD 1300 has better dark-state performance when $\theta_6$ is from −40 degrees to 20 degrees, and meanwhile the angle between the light-collecting direction 1352 and the light absorption axis 1322 is from −85 degrees to −25 degrees.

Then, the dark-state brightness observed at the zenithal angle of 45 degrees and the azimuthal angle of 315 degrees is considered. From FIG. 14b, it can be known that if ½ΔD is used as the dark-state standard, it is found that the LCD 1300 has better dark-state performance when $\theta_6$ is from 25 degrees to 160 degrees. That is, under the condition that the light absorption axis of the polarizer is fixed, and when the angle between the light-collecting direction 1352 and the light absorption axis 1322 is from −20 degrees to −115 degrees, the LCD 1300 has better dark-state performance. Further, if ¼ΔD is used as the dark-state standard, it is found that the LCD 1300 has better dark-state performance when is from 55 degrees to 135 degrees, and meanwhile the angle between the light-collecting direction 1352 and the light absorption axis 1322 is from 10 degrees to 90 degrees, the LCD 1300 has better dark-state performance. Further, if ⅛ΔD is used as the dark-state standard, it is found that the LCD 1300 has better dark-state performance when $\theta_6$ is from 60 degrees to 125 degrees, and meanwhile the angle between the light-collecting direction 1352 and the light absorption axis 1322 is from 15 degrees to 80 degrees, the LCD 1300 has better dark-state performance.

Further, in the embodiment in which the diffractive direction 1312 of the diffraction plate 1310 is along the direction of 0 degree, if it is desired to simultaneously meet the requirements of the dark-state effect observed at the zenithal angle of 45 degrees and the azimuthal angle of 0 degree and that observed at the zenithal angle of 45 degrees and the azimuthal angle of 270 degrees, the angle included between the light-collecting direction 1352 and the light absorption axis 1322 is designed to a range from −115 degrees to −65 degrees or from −20 degrees to 30 degrees. Further, the brightness distribution trend at dark-state with the included angle of 45 degrees between the diffractive direction and the light absorption axis is similar to that with the included angle of −45 degrees therebetween, and the brightness distribution trend at dark-state with the included angle of 0 degree between the diffractive direction and the light absorption axis is similar to that with the included angle of 90 degrees therebetween, and thus analogously, the angle along the first or second diffractive direction can be selected from one of 45/−45 degrees or from one of 0/90 degrees.

Summing up the description of the present embodiment, for the LCD 1300, if it is desired to satisfy the requirements of observers at various viewing angles, the angle included between the light-collecting direction 1352 of the brightness enhancement film of the LCD 1300 and the light absorption axis 1122 of the polarizer is from −115 degrees to −25 degrees or from −20 degrees to 15 degrees.

It can be known from the above that, the sixth and seventh embodiments provide the designs of the angular relationship between the light-collecting direction of the brightness enhancement film and the light diffractive direction of the diffraction plate for improving the dark-state light leakage along the light absorption axis 1322 of ±45 degrees with respect to VA and TN LCDs respectively. However, if the type of LCD is not limited (to VA or TN, or the diffractive direction of the diffraction plate (0 or 45 degrees), the angle between the diffractive direction of the diffraction plate and the light-collecting direction of the brightness enhancement film can an intersection of the aforementioned preferred angle ranges, i.e. from −20 degrees to 15 degrees and from 70 degrees to 115 degrees.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display, comprising:
a liquid crystal panel comprising a liquid crystal layer,
a diffraction plate disposed on a first surface of the liquid crystal panel, wherein the diffraction plate includes a plurality of grating regions having at least one first diffractive direction and a plurality of space regions located between the grating regions, and the space regions have no grating and are transparent;
a first brightness enhancement film disposed on a second surface of the liquid crystal panel, wherein the first brightness enhancement film having a first light-collecting direction, and the second surface is opposite to the first surface of the liquid crystal panel;
wherein an included angle between the first diffractive direction and the first light-collecting direction is in a range from −110 degrees to −65 degrees or from −30 degrees to 20 degrees and excluding 0 degree and −90 degrees.

2. The liquid crystal display as claimed in claim 1, further comprise:
a first polarizer with a first absorption axis disposed between the liquid crystal panel and the diffraction plate, wherein an included angle between the first light-collecting direction and the first absorption axis is ranged from −30 degrees to −20 degrees, from −75 degrees to −60 degrees, from 55 degrees to 80 degrees, or from 10 degrees to 25 degrees.

3. A liquid crystal display, comprising:
a liquid crystal panel comprising a liquid crystal layer;
a diffraction plate disposed on a first surface of the liquid crystal panel, wherein the diffraction plate includes a plurality of grating regions having at least one first diffractive direction and a plurality of space regions located between the grating regions, and the space regions have no grating and are transparent;
a first brightness enhancement film disposed on a second surface of the liquid crystal panel, wherein the first brightness enhancement film having a first light-collecting direction, and the second surface is opposite to the first surface of the liquid crystal panel;
wherein an included angle between the first diffractive direction and the first light-collecting direction is in a range from −115 degrees to −60 degrees or from −30 degrees to 15 degrees and excluding 0 degree and −90 degrees.

4. The liquid crystal display as claimed in claim 3, further comprise:
a first polarizer with a first absorption axis disposed between the liquid crystal panel and the diffraction plate, wherein an included angle between the first light-collecting direction and the first absorption axis is ranged from 40 degrees to −5 degrees, from −95 degrees to −65 degrees, or from 70 degrees to 80 degrees.

5. A liquid crystal display, comprising:
a liquid crystal panel comprising a liquid crystal layer;
a diffraction plate disposed on a first surface of the liquid crystal panel, wherein the diffraction plate includes a plurality of grating regions having at least one diffractive direction and a plurality of space regions located between the grating regions, and the space regions have no grating and are transparent;
a first polarizer disposed on the first surface of the liquid crystal panel, wherein the first polarizer has a first absorption axis;
a first brightness enhancement film disposed on a second surface of the liquid crystal panel, wherein the first brightness enhancement film having a first light-collecting direction, and the second surface is opposite to the first surface of the liquid crystal panel;
wherein an included angle between the first absorption axis and the first light-collecting direction is in a range from 70 degrees to 115 degrees or from −20 degrees to 15 degrees and excluding 0 degree and 90 degrees.

6. The liquid crystal display as claimed in claim 5, wherein the diffraction plate is disposed between the first polarizer and the liquid crystal panel.

7. The liquid crystal display as claimed in claim 5, wherein the first polarizer is disposed between the liquid crystal panel and the diffraction plate.

8. The liquid crystal display as claimed in claim 5, wherein the first absorption axis is perpendicular or parallel to the first light-collecting direction.

9. A liquid crystal display, comprising:
a liquid crystal panel comprising a liquid crystal layer,
a diffraction plate disposed on a first surface of the liquid crystal panel, wherein the diffraction plate includes a plurality of grating regions having at least one first diffractive direction and a plurality of space regions located between the grating regions, and the space regions have no grating and are transparent;
a first brightness enhancement film disposed on a second surface of the liquid crystal panel, wherein the first brightness enhancement film having a first light-collecting direction, and the second surface is opposite to the first surface of the liquid crystal panel;
wherein an included angle between the first diffractive direction and the first light-collecting direction is in a range from −110 degrees to −65 degrees or from −30 degrees to 20 degrees and excluding ranges of −8 degrees to 8 degrees and −82 degrees to −98 degrees.

* * * * *